US008781890B2

(12) United States Patent
Distefano, III

(10) Patent No.: US 8,781,890 B2
(45) Date of Patent: *Jul. 15, 2014

(54) ACCESS RIGHTS MODIFICATION WITHIN WEBPAGE IMPLEMENTATION SERVER SYSTEM

(71) Applicant: PT 259, LLC, Boca Raton, FL (US)

(72) Inventor: Thomas L. Distefano, III, Boca Raton, FL (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/763,226

(22) Filed: Feb. 8, 2013

(65) Prior Publication Data

US 2013/0173401 A1   Jul. 4, 2013

Related U.S. Application Data

(63) Continuation of application No. 13/669,027, filed on Nov. 5, 2012, now Pat. No. 8,423,399, which is a continuation of application No. 13/206,483, filed on Aug. 9, 2011, now Pat. No. 8,335,713, which is a continuation of application No. 09/589,551, filed on Jun. 7, 2000, now Pat. No. 7,996,259.

(51) Int. Cl.
| | |
|---|---|
| *G06Q 30/00* | (2012.01) |
| *G06Q 30/02* | (2012.01) |
| *G06F 17/22* | (2006.01) |
| *G06F 3/0481* | (2013.01) |
| *G06Q 30/06* | (2012.01) |
| *G06Q 30/08* | (2012.01) |

(52) U.S. Cl.
CPC ........ *G06F 17/2247* (2013.01); *G06Q 30/0273* (2013.01); *G06F 3/0481* (2013.01); *G06Q 30/0256* (2013.01); *G06Q 30/0641* (2013.01); *G06Q 30/08* (2013.01); *G06Q 30/0207* (2013.01); *G06Q 30/02* (2013.01); *G06Q 30/0277* (2013.01); *G06Q 30/0276* (2013.01)
USPC ....................................................... 705/14.1

(58) Field of Classification Search
CPC ..................................................... G06Q 90/00

USPC ......................................................... 705/14.1
See application file for complete search history.

(56) References Cited

U.S. PATENT DOCUMENTS

| 5,560,006 A | 9/1996 | Layden et al. |
| 5,778,367 A | 7/1998 | Wesinger, Jr. et al. |

(Continued)

FOREIGN PATENT DOCUMENTS

| JP | H10162029 A | 6/1998 |
| JP | H10301911 A | 11/1998 |

(Continued)

OTHER PUBLICATIONS

Kumar, N.S. et al., "Social Networking Site for Self Portfolio," [online] in UREAT Int'l. J. of Research in Engineering & Advanced Technology, vol. 1, No. 1, Mar. 2013, retrieved from the Internet: <http://www.ijreat.org/Papers%202013/Volume1/IJREATV1I1055. pdf>, 4 pg.

(Continued)

*Primary Examiner* — Daniel Lastra
(74) *Attorney, Agent, or Firm* — Cuenot, Forsythe & Kim, LLC

(57) ABSTRACT

A method, within a computer hardware system, includes the following. Limited access rights to the computer hardware system are associating with a first entity. In response to the first entity submitting a registration for a first website, the limited access rights previously associated with the first entity are removed. A first functional marketing element associated with a second entity is inserted within a first website associated with a first entity. A second functional marketing element associated with the first entity is reciprocally inserted within a second website associated with the second entity based upon the first functional marketing element being inserted within the first website. The second functional marketing element, within the second website, includes a link to the first website, and the first functional marketing element, within the first website, includes a link to the second website.

17 Claims, 29 Drawing Sheets

(56) References Cited

U.S. PATENT DOCUMENTS

| | | | |
|---|---|---|---|
| 5,787,254 | A | 7/1998 | Maddalozzo, Jr. et al. |
| 5,913,212 | A | 6/1999 | Sutcliffe et al. |
| 5,937,392 | A | 8/1999 | Alberts |
| 5,950,200 | A | 9/1999 | Sudai et al. |
| 5,960,409 | A | 9/1999 | Wexler |
| 5,963,951 | A | 10/1999 | Collins |
| 5,987,440 | A | 11/1999 | O'Neil et al. |
| 5,995,099 | A | 11/1999 | Horstmann |
| 6,009,410 | A | 12/1999 | LeMole et al. |
| 6,029,141 | A | 2/2000 | Bezos et al. |
| 6,035,334 | A | 3/2000 | Martin et al. |
| 6,052,122 | A | 4/2000 | Sutcliffe et al. |
| 6,058,417 | A | 5/2000 | Hess et al. |
| 6,061,681 | A | 5/2000 | Collins |
| 6,073,105 | A | 6/2000 | Sutcliffe et al. |
| 6,073,138 | A | 6/2000 | De L'Etraz et al. |
| 6,175,831 | B1 | 1/2001 | Weinreich et al. |
| 6,199,111 | B1 | 3/2001 | Hara et al. |
| 6,253,216 | B1 | 6/2001 | Sutcliffe et al. |
| 6,269,369 | B1 | 7/2001 | Robertson |
| 6,330,575 | B1 | 12/2001 | Moore et al. |
| 6,360,222 | B1 | 3/2002 | Quinn |
| 6,401,075 | B1 | 6/2002 | Mason et al. |
| 6,480,885 | B1 | 11/2002 | Olivier |
| 6,601,057 | B1 | 7/2003 | Underwood et al. |
| 6,629,135 | B1 | 9/2003 | Ross et al. |
| 6,839,680 | B1 | 1/2005 | Liu et al. |
| 7,996,259 | B1 | 8/2011 | Distefano, III |
| 8,335,713 | B2 | 12/2012 | Distefano, III |
| 8,412,570 | B1 | 4/2013 | Distefano, III |
| 8,417,567 | B2 | 4/2013 | Distefano, III |
| 8,423,399 | B2 * | 4/2013 | Distefano, III .............. 705/14.1 |
| 8,442,860 | B2 | 5/2013 | Distefano, III |
| 8,589,222 | B2 | 11/2013 | Distefano, III |
| 8,650,076 | B2 | 2/2014 | Distefano, III |
| 2012/0185339 | A1 | 7/2012 | Distefano, III |
| 2013/0066727 | A1 | 3/2013 | Distefano, III |
| 2013/0066728 | A1 | 3/2013 | Distefano, III |
| 2013/0066729 | A1 | 3/2013 | Distefano, III |
| 2013/0073397 | A1 | 3/2013 | Distefano, III |
| 2013/0151338 | A1 | 6/2013 | Distefano, III |
| 2013/0151354 | A1 | 6/2013 | Distefano, III |
| 2013/0151982 | A1 | 6/2013 | Distefano, III |
| 2013/0305132 | A1 | 11/2013 | Distefano, III |
| 2013/0311876 | A1 | 11/2013 | Distefano, III |

FOREIGN PATENT DOCUMENTS

| | | | |
|---|---|---|---|
| KR | 20000012595 | A | 3/2000 |
| WO | 9923591 | A1 | 5/1999 |
| WO | 0016210 | A1 | 3/2000 |
| WO | 0021012 | A2 | 4/2000 |
| WO | 0140968 | A2 | 6/2001 |

OTHER PUBLICATIONS

"LiveJournal.com", [online] LiveJournal, Inc. © 1999, retrieved Jan. 27, 2014, retrieved from the Internet: <http://web.archive.org/web/20000604011251/http://www.livejournal.com/>, 15 pg.

"AsianAvenue.com", [online] Community Connect Inc. © 1997-2000, retrieved Jan. 27, 2014, retrieved from the internet: <https://web.archive.org/web/20000510055338/http://www.asianavenue.com/>, 11 pg.

"BlackPlanet.com," [online] BlackPlanet.com © 2000, retrieved Jan. 27, 2014, retrieved from the Internet: <https://web.archive.org/web/20000606010618/http://www.blackplanet.com/>, 10 pg.

Lazar, J., "The 10 Biggest Blunders That Businesses Make on the Web," [online] Adapted from Interactive Age, May 22, 1995. Copyright 1995, Lazar Productions [retrieved Apr. 24, 2014] retrieved from the Internet: <http://www.jr.co.il/training/web01.txt>, 4 Pg.

Kennedy, D.M., "Practice Management: Site Plan 12 Steps to Promoting Your Website," [online] in General Practice, Solo & Small Firm Division Magazine, vol. 17, No. 6, Sep. 2000 [retrieved Apr. 24, 2014] retrieved from the Internet: <http://www.americanbar.org/newsletter/publications/gp_solo_magazine_home/gp_solo_magazine_index/sep2000kennedy.html>, 4 pg.

"Selling Online: More Than Hitting a Few Keys," In ProQuest, Interactive Daily, Phillips Business Information Corporation © Sep 5, 1995.

Palmer, A. et al., "The Role of Electronic Commerce in Creating Virtual Tourism Destination Marketing Organisations," [online] In Int'l J. of Contemporary Hospitality Management, vol. 12, No. 3, pp. 198-204, 2000.

Iyer, S., "Factors Distinguishing High Traffic Online Stores From Low Traffic On-Line Stores," Thesis—Carleton University, Sprott School of Business, 2000, 94 pg.

Schwabach, A., "Intellectual Property: A Reference Handbook," ABC-CLIO, 2007, Pub. Apr. 26, 2007, 318 pg, [Abstract only].

Kumar, N.S. et al., "Social Networking Site for Self Portfolio"[online] in UREAT Int'l. J. of Research in Engineering & Advanced Technology, vol. 1, No. 1, Mar. 2013, retrieved from the Internet: <http://www.ijreat.org/Papers%202013/Volume1/IJREATV1I1055.pdf>, 4 pg.

"Overview of Webboard," [online] O'Reilly & Associates, Inc. © 1998, retrieved from the Internet: <http://domin.dom.edu/documents/webboard/overviewwb.PDF>, 16 pg.

Casey, C., "Creating and managing webrings: a step-by-step guide," [online] Information Technology and Libraries, vol. 18, No. 4, pp. 214-224, Dec. 1, 1999 [retrieved Jul. 27, 2013], retrieved from the Internet: <http://www.accessmylibrary.com/article/print/1G1-59021370>, 12 pgs.

Donath, J. et al., "Public Displays of Connection," BTTechnology Journal, vol. 22, No. 4, pp. 71-82, Oct. 2004.

Boyd, D. M. et al., "Social Network Sites: Definition, History, and Scholarship," [online] In Journal of Computer-Mediated Communication, vol. 13, No. 1, Art. 11, pp. 210-230, Oct. 2007 [retrieved Aug. 1, 2013], retrieved from the Internet: <http://jcmc.indiana.edu/vol13/issue1/boyd.ellison.html>, 20 pg.

* cited by examiner

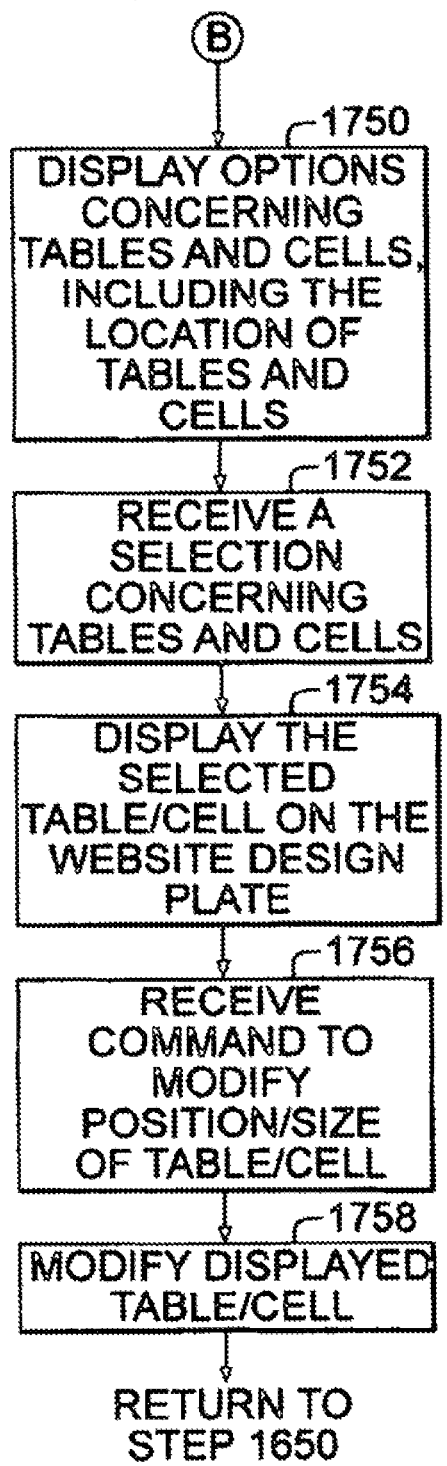

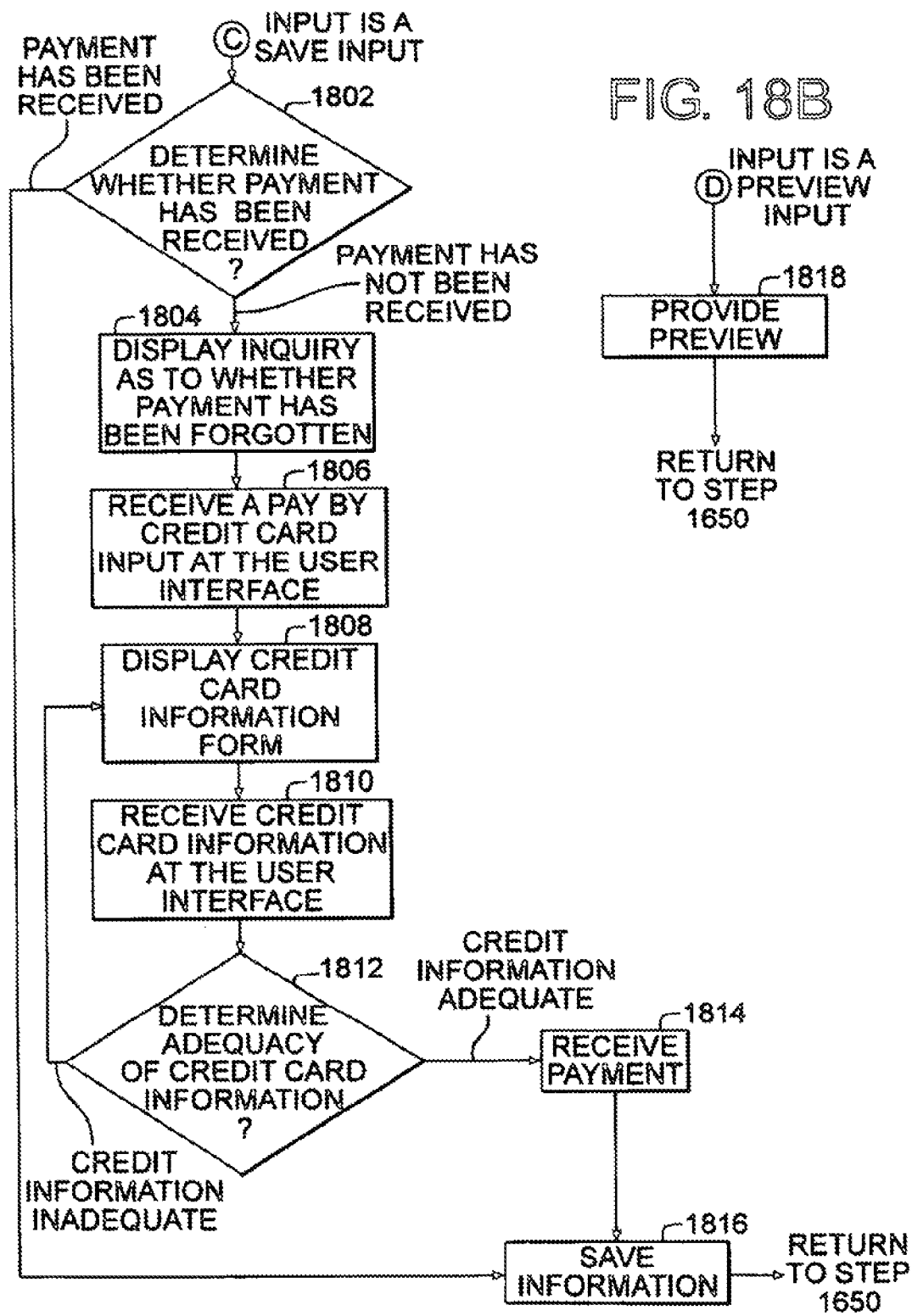

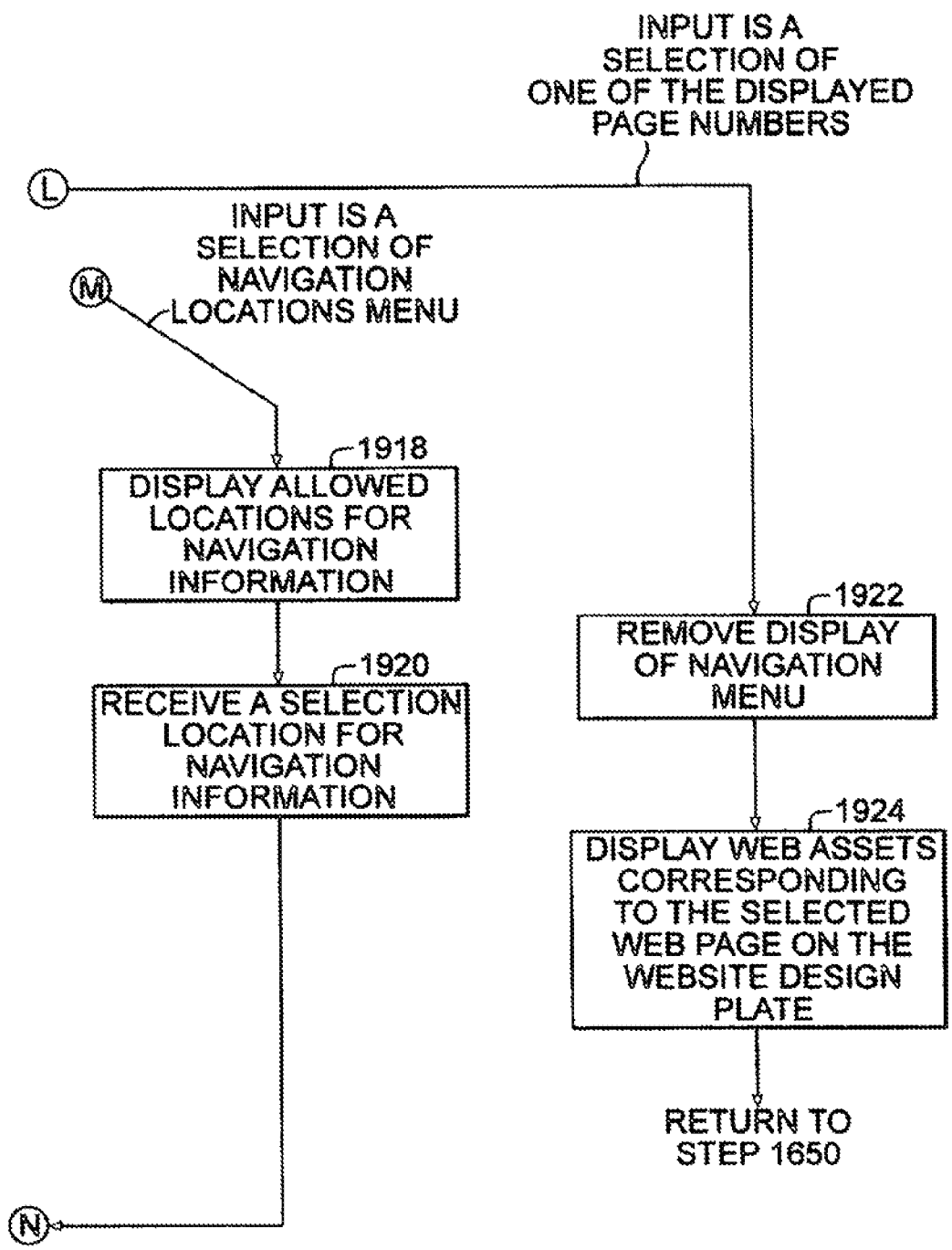

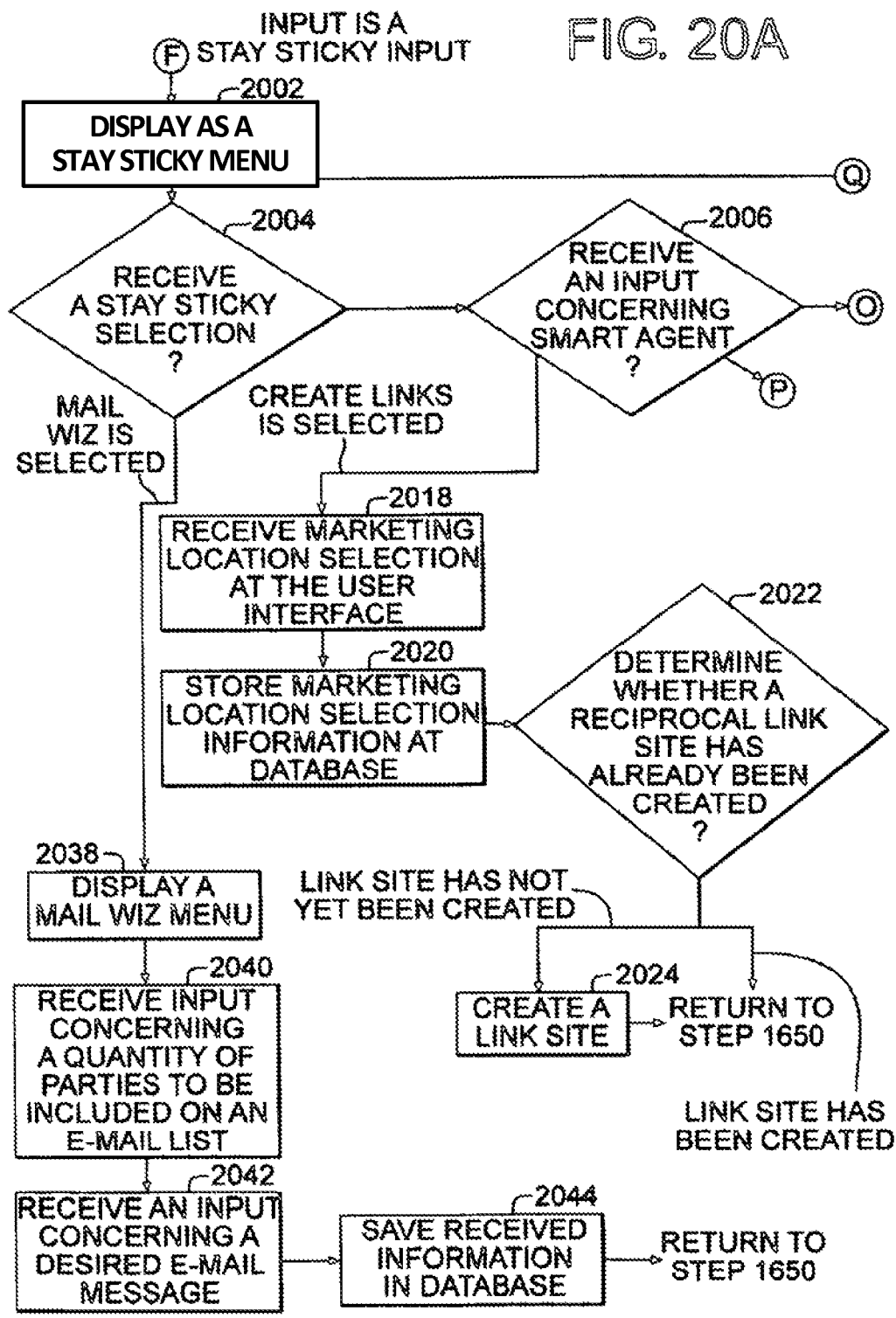

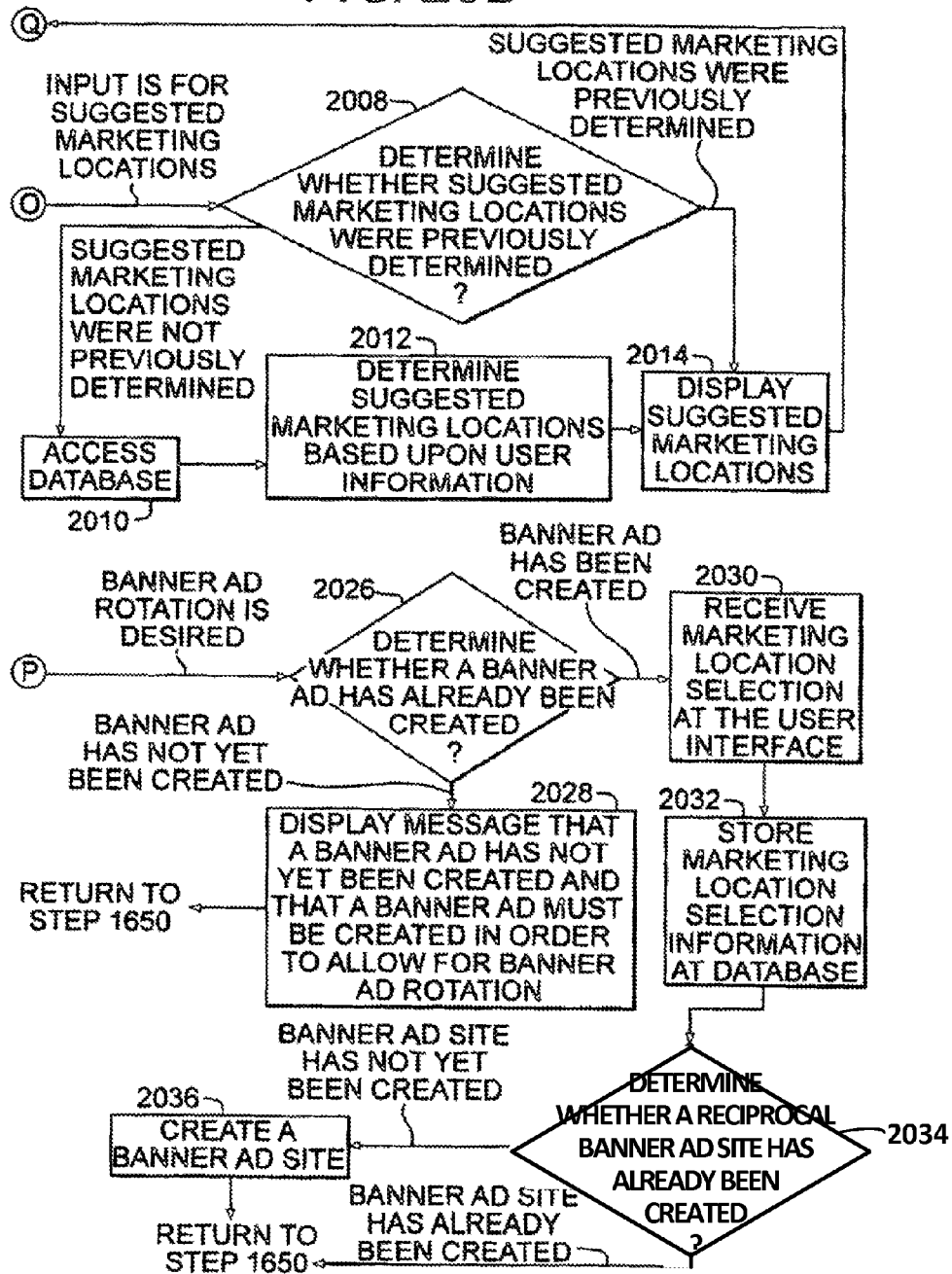

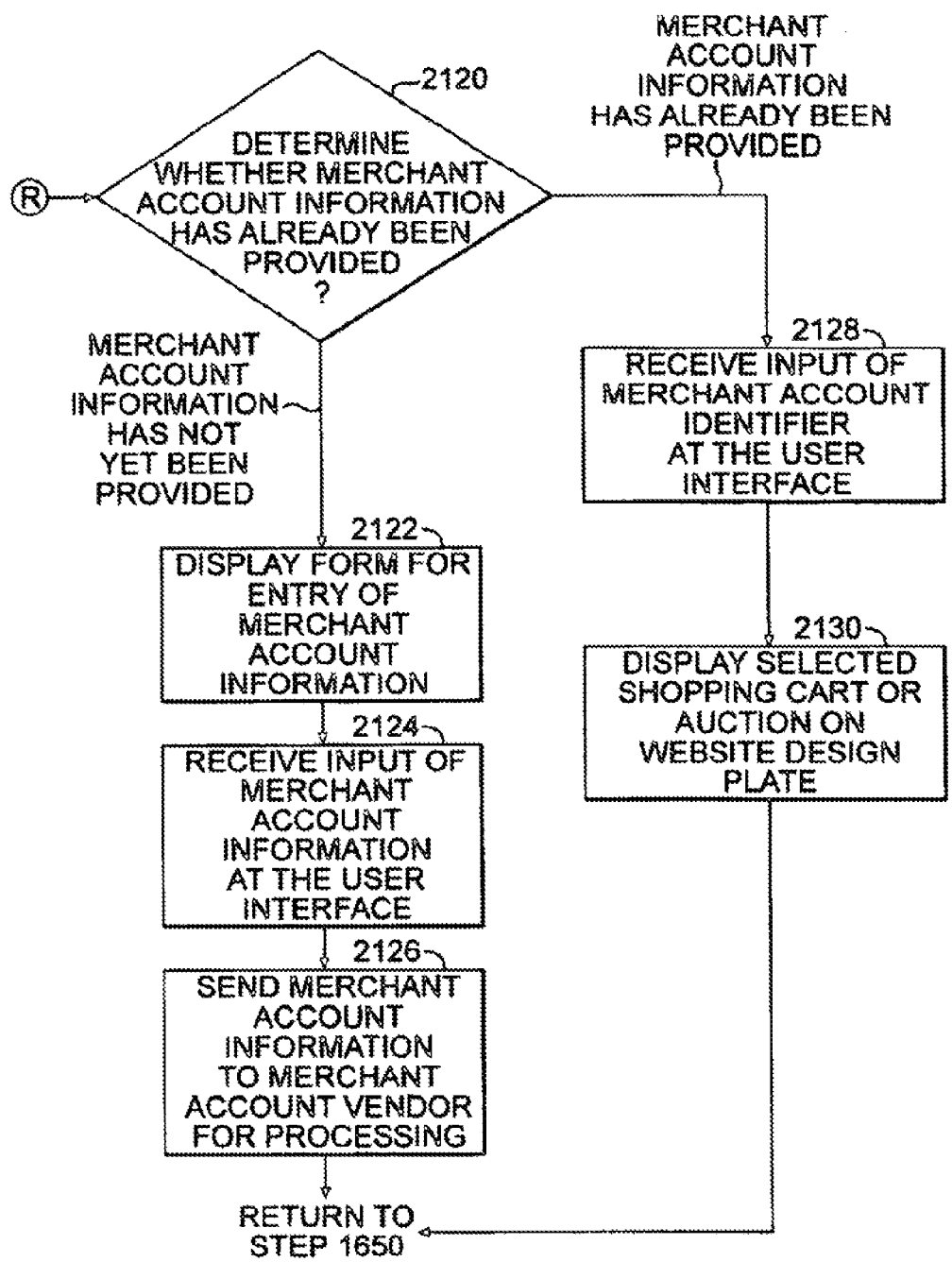

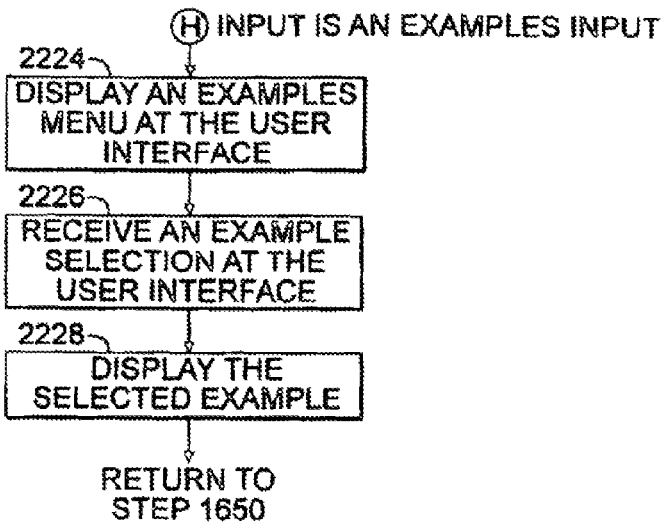
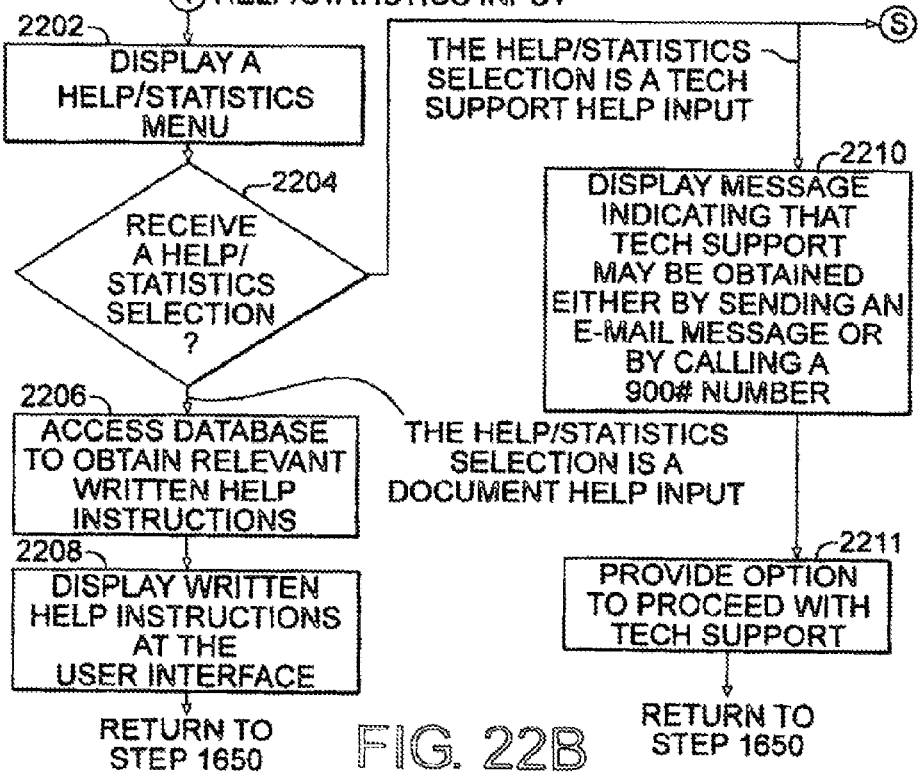

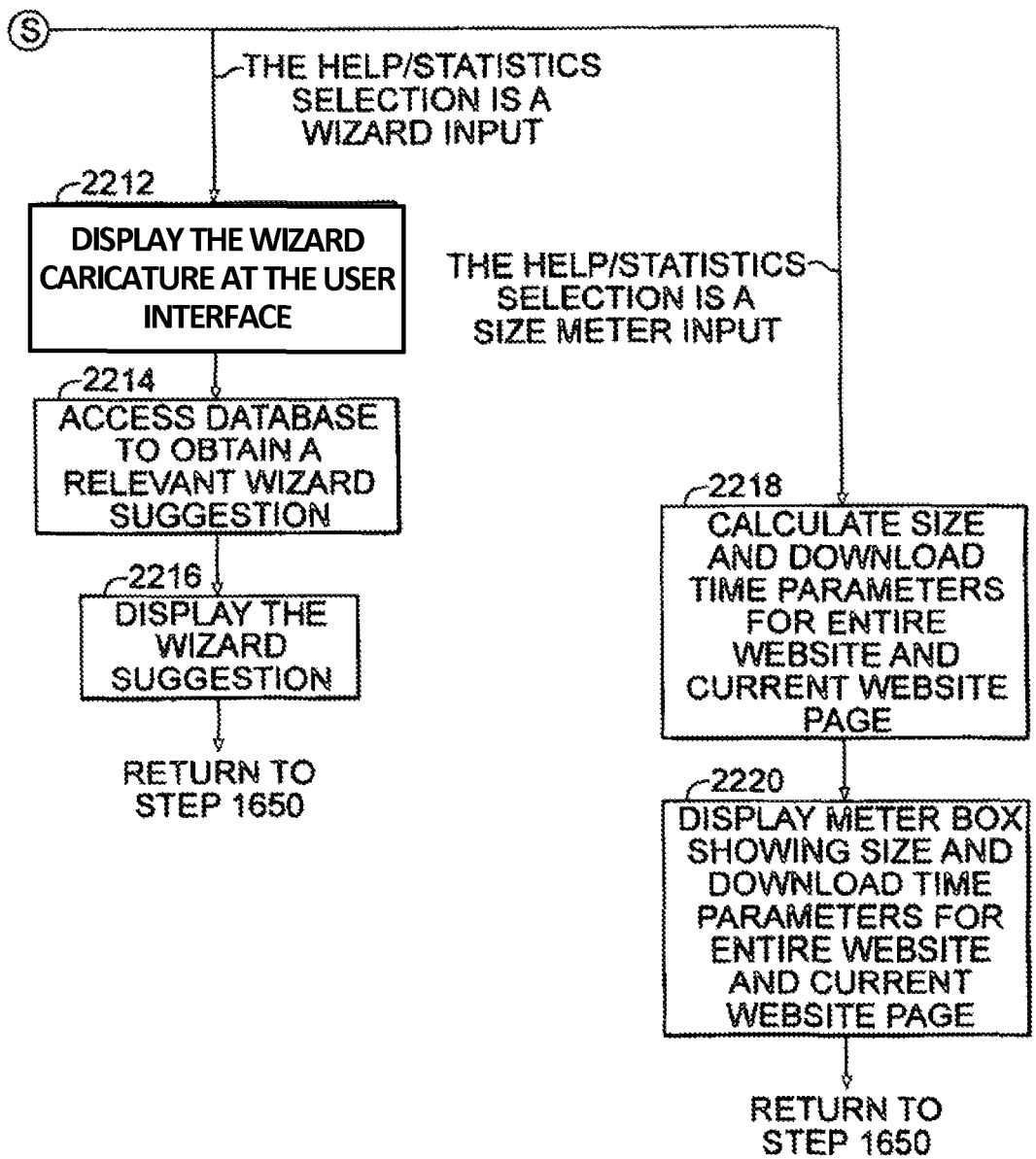

ACCESS RIGHTS MODIFICATION WITHIN WEBPAGE IMPLEMENTATION SERVER SYSTEM

CROSS-REFERENCE TO RELATED APPLICATIONS

This application is a Continuation of U.S. patent Ser. No. 13/669,027, filed on Nov. 5, 2012, which is a Continuation of U.S. application Ser. No. 13/206,483 (now U.S. Pat. No. 8,335,713), filed on Aug. 9, 2011, which is a Continuation of U.S. application Ser. No. 09/589,551 (now U.S. Pat. No. 7,996,259), filed on Jun. 7, 2000.

STATEMENT REGARDING FEDERALLY SPONSORED RESEARCH OR DEVELOPMENT (Not Applicable)

FIELD OF THE INVENTION

The present invention relates generally to creating and posting web pages to the internet, and more specifically, to a method for more easily developing web pages through the use of a graphical user interface.

BACKGROUND OF THE INVENTION

The World Wide Web (web) has rapidly become an invaluable tool to individuals and businesses. Not only can an individual or business post information on the web, but it can also use the web to transact business. Because the public is acutely aware of the web's business and personal benefits, millions of web pages are being added to the web each year.

Typically, a web page is defined by a document containing HyperText Markup Language (HTML) code. An HTML document suitable for posting on the internet includes both "content" and "markup." The content is information which describes a web page's text or other information for display or playback on a computer's monitor, speakers, etc. The markup is information which describes the web page's behavioral characteristics, such as how the content is displayed and how other information can be accessed via the web page.

In order to provide web-based information and services over the internet, the web employs "client" computers, "browser" software, and "server" computers. A client computer is a computer used by an individual to connect to the internet and access web pages. A browser is a software application, located on a client computer, which requests, via the internet, a web page from a server computer. After receiving the web page, the browser displays the web page on the client computer's monitor. A server computer is a computer which stores web page information, retrieves that information in response to a browser's request, and sends the information, via the internet, to the client computer. Thus, after a web page is created, the page must be "posted" to a particular server computer which "hosts" the page, so that the page can be accessed over the internet.

In order to have one's web page hosted by a server, the individual must contract with an internet service provider (ISP) associated with the server. This contract specifies, among other things, the duration of the time that the ISP will host the page, and how much the individual will pay for that hosting service.

Even though the idea of having one's own web page is appealing, the average individual has little or no knowledge about how to create a web page. Particularly, the average individual does not know how to create an HTML document or to post that document to a server computer. Unless that individual is willing to learn how to create and post their own web page, that individual is faced with few options.

The most commonly used avenue for an individual to get his web page on the internet is to employ one of numerous companies to provide, for a fee, web page/website development services. After contacting such a website development company, the individual would meet with one of the company's web page designers to explain the individual's concept for his web page. The designer would then create the associated HTML document. After approval by the individual, the designer may provide the service of posting the web page to a server. The server typically is not associated with the website development company. Thus, the individual must separately contract with an ISP associated with the server to host the web page. Typically, this web page creation and posting process is time consuming and expensive, because it requires the individual and the designer to spend a significant amount of time together working on a particular page design. In addition, the process is inefficient because the individual must work separately with a website development company and an ISP.

The difficulties and expense associated with web page creation and design are exacerbated by the fact that many individuals who desire to set up web pages are doing so for commercial reasons, i.e., the individuals desire to conduct business or "e-commerce" over the internet using their web pages. Developing a web page/website suitable for e-commerce typically requires at least two types of features above and beyond those required for a standard (non-commercial) web page/website. First, an e-commerce website typically requires marketing features. As noted, there are millions of web pages already existing on the interest, and so the success of an internet-based business employing a website depends critically upon whether consumers on the internet are aware of, and can easily access, the website.

With respect to these marketing features, a common way of marketing a website on the internet is to have other websites display advertising messages ("banner ads") concerning the website. A second way of marketing a particular website on the internet is simply to have other websites display selectable commands ("links") which, if selected by a person accessing the other websites using his browser, cause the browser to access the particular website. Although the use of such banner ads and links is very common, the setting up of such mechanisms is not always easy. In particular, other websites typically do not display banner ads and links for a particular website without contractual arrangements, including payment, which can be difficult for a novice web designer to arrange and expensive to arrange via a website development company.

In addition to marketing features, an e-commerce website typically also requires features that allow the conducting of sales transactions, i.e., features for executing transactions involving the buying and selling of goods and/or services. Such features typically include a sales mechanism, i.e., a "shopping cart" mechanism or an "auction." Further, such features typically include a payment arrangement, i.e., an arrangement allowing for transfers from a purchaser's credit card to a merchant account associated with the e-commerce website. The setting up of such sales mechanisms and payment arrangements also can be difficult for a novice web designer and expensive if performed by a website development company.

What is needed, therefore, is a method for enabling an individual to conveniently design a web page without requiring that individual to learn HTML or to interact extensively with a web page designer at a website development company. What is further needed is a streamlined method for web page/website development and, in particular, a method of facilitating the development of e-commerce websites having key marketing and sales transaction features.

SUMMARY OF INVENTION

The present invention relates to a method of assisting a website designer in establishing an arrangement between a first website being designed by the website designer and a second website in order to market the first website at the second website upon the activation of the first website on the internet. The method includes, during design of the first website, receiving information at a user interface indicating a type of an element for marketing that is to be displayed at the second website, and information specifying the second website at which the element is to be displayed. The method further includes saving the information at a first database that is coupled to the user interface, obtaining the element for marketing of the type indicated, and causing the display of the element for marketing at the second website when the first website is activated with respect to the internet. The element for marketing includes at least one of a banner ad concerning the first website and a link to the first website.

The present invention additionally relates to a method of assisting a website designer in establishing an e-commerce feature on a first website being designed by the website designer for access by third parties upon the activation of the first website on the internet. The method includes receiving at a user interface a selection of the e-commerce feature that is desired to be implemented on the first website, wherein the e-commerce feature is at least one of a shopping cart and an auction. The method further includes receiving at the user interface information concerning a picture of a product desired to be sold using the e-commerce feature, receiving at the user interface information concerning a written description of the product, receiving at the user interface information concerning a price of the product, and receiving at the user interface information concerning an identification number of the product. The method additionally includes, when the first website is activated on the internet, displaying the e-commerce feature on the first website. The display of the e-commerce feature includes the display of at least some of the picture, written description, price and identification information of the product.

The present invention further relates to a computer-readable storage medium containing computer executable code for instructing at least one computer to perform several steps. In particular, the computer executable code instructs the computer to perform the step of, during design of a first website, receiving information at a user interface indicating a type of an element for marketing that is to be displayed at a second website, and information specifying the second website at which the element is to be displayed. The steps further include saving the information at a first database that is coupled to the user interface, obtaining an element for marketing of the type indicated, and causing the display of the element for marketing at the second website when the first website is activated with respect to the internet. The element for marketing includes at least one of a banner ad concerning the first website and a link to the first website.

The present invention additionally relates to a computer-readable storage medium containing computer executable code for instructing at least one computer to perform several steps. In particular, the computer executable code instructs the computer to perform the step of receiving at a user interface a selection of an e-commerce feature that is desired to be implemented on a first website, wherein the e-commerce feature is at least one of a shopping cart and an auction. The computer executable code further instructs the computer to perform the steps of receiving at the user interface information concerning a picture of a product desired to be sold using the e-commerce feature, receiving at the user interface information concerning a written description of the product, receiving at the user interface information concerning a price of the product, receiving at the user interface information concerning an identification number of the product and, when the first website is activated on the internet, displaying the e-commerce feature on the first website. The display of the e-commerce feature includes the display of at least some of the picture, written description, price and identification information of the product.

The present invention further relates to an internet-based system for assisting a website designer in establishing an arrangement between a first website being designed by the website designer and a second website in order to market the first website at the second website upon the activation of the first website on the internet. The system includes a server computer accessible by a plurality of registered user computers and a plurality of unregistered computers using the internet. The server computer receives at a user interface displayed at one of the registered user computers information indicating a type of an element for marketing that is to be displayed at the second website, and information specifying the second website at which the element is to be displayed. The server computer additionally saves the information at a first database that is coupled to the server computer, and obtains an element for marketing. The server computer further hosts the second website, activates the first website on the internet by hosting the first website on the internet, provides a web page of the second website to one of the unregistered computers, and displays the element for marketing on the web page.

BRIEF DESCRIPTION OF THE DRAWINGS

FIGS. 17A and 17B illustrate flowcharts with method steps for providing text and tables/cells into a web page of a website that is being developed, including text editing, which can be performed as part of the flowcharts of FIGS. 16A and 16B;

FIGS. 18A and 18B illustrate flowcharts with method steps for saving website information and previewing website operation, which can be performed as part of the flowcharts of FIGS. 16A and 16B;

FIGS. 19A and 19B illustrates flowcharts with method steps for generating a website outline using a navigation feature, which can be performed as part of the flowcharts of FIGS. 16A and 16B;

FIGS. 20A and 20B illustrate flowcharts with method steps for performing STAY STICKY™ features, including smart agent features and MAIL WIZ™ features, which can be performed as part of the flowcharts of FIGS. 16A and 16B;

FIGS. 21A and 21B illustrate flowcharts with method steps for performing e-commerce features, which can be performed as part of the flowcharts of FIGS. 16A and 16B;

FIGS. 22A, 22B and 22C illustrate flowcharts with method steps for performing examples and help/statistics features, which can be performed as part of the flowcharts of FIGS. 16A and 16B.

DETAILED DESCRIPTION OF THE INVENTION

Figure 1:
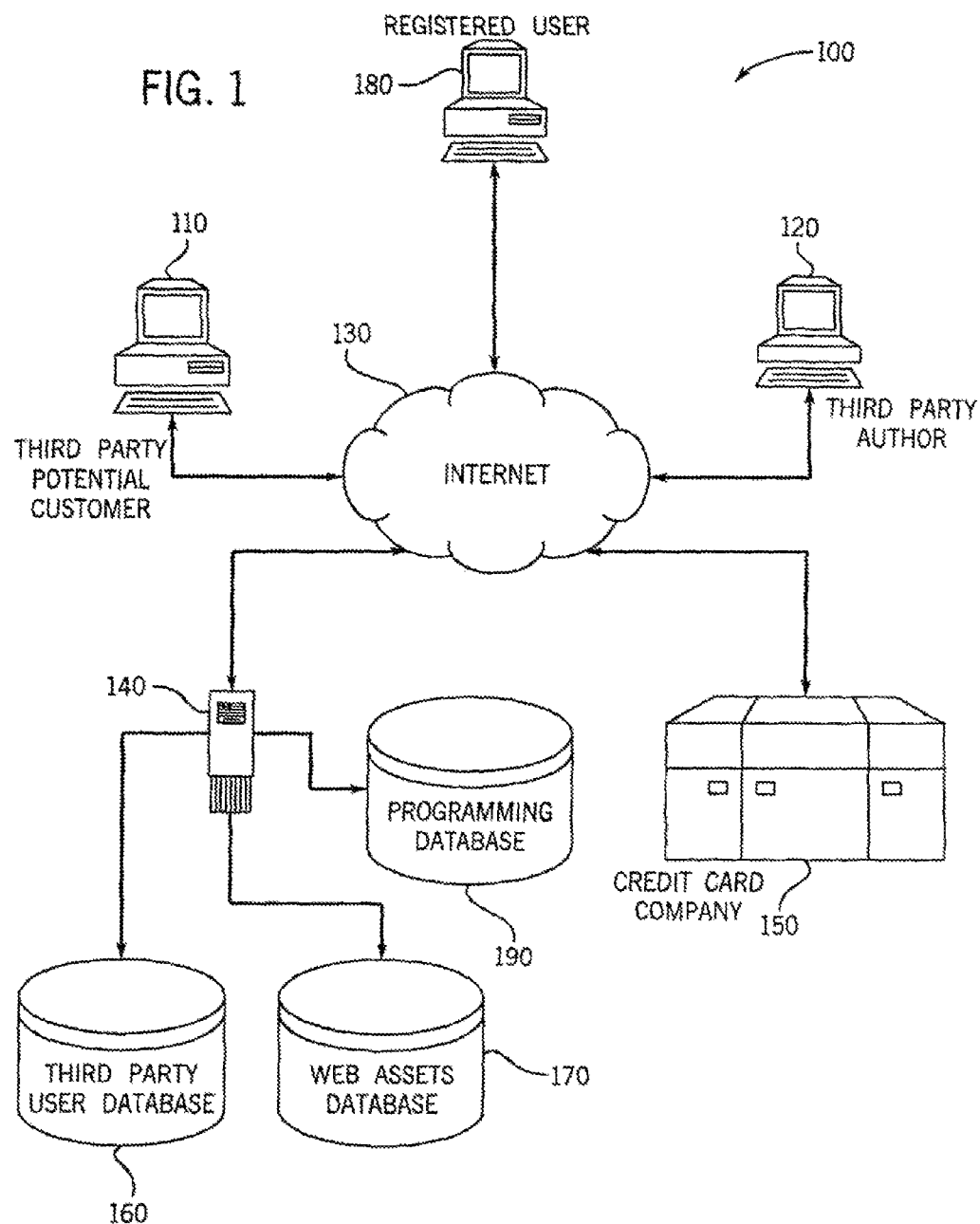
FIG. 1 illustrates a system in which the method of the present invention can be practiced.

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims. The present invention is a method for developing a website through the use of a graphical user interface. FIG. 1 is a block diagram illustrating a generalized computer/internet system 100 in which the method of the present invention can be practiced. Specifically, the preferred system 100 includes a server computer 140 operably connected to the internet 130 using standard techniques well-known in the art, for instance the TCP/IP protocol. The method preferably can be implemented through the use of the server computer 140 using standard computer programming techniques well-known in the art. As an example, the server computer 140 can preferably be programmed using the Java™ programming language distributed by Sun Microcomputer Corp. of Palo Alto, Calif.

Three types of other parties can interact with the server computer 140. First, registered users who have logged in with respect to the server computer 140, as discussed with reference to FIG. 11, can fully access the server computer at one or more registered users computers 180. Second, third party potential customers who have not yet logged in with respect to the server computer 140 can obtain limited access to the server computer at one or more third party potential customers computers 110. Finally, third party authors who contribute web assets for use in web pages created by registered users can access the server computer 140, from one or more third party author computers 120, for the limited purpose of uploading web assets to the server computer for distribution. Registered users computers 180, third party potential customers computers 110 and third party authors computers 120 are home computers or other interface devices (not necessarily complete computers) that are capable of accessing the server computer 140 through the internet 130 using standard web-browsers, well-known in the art.

Figure 15:
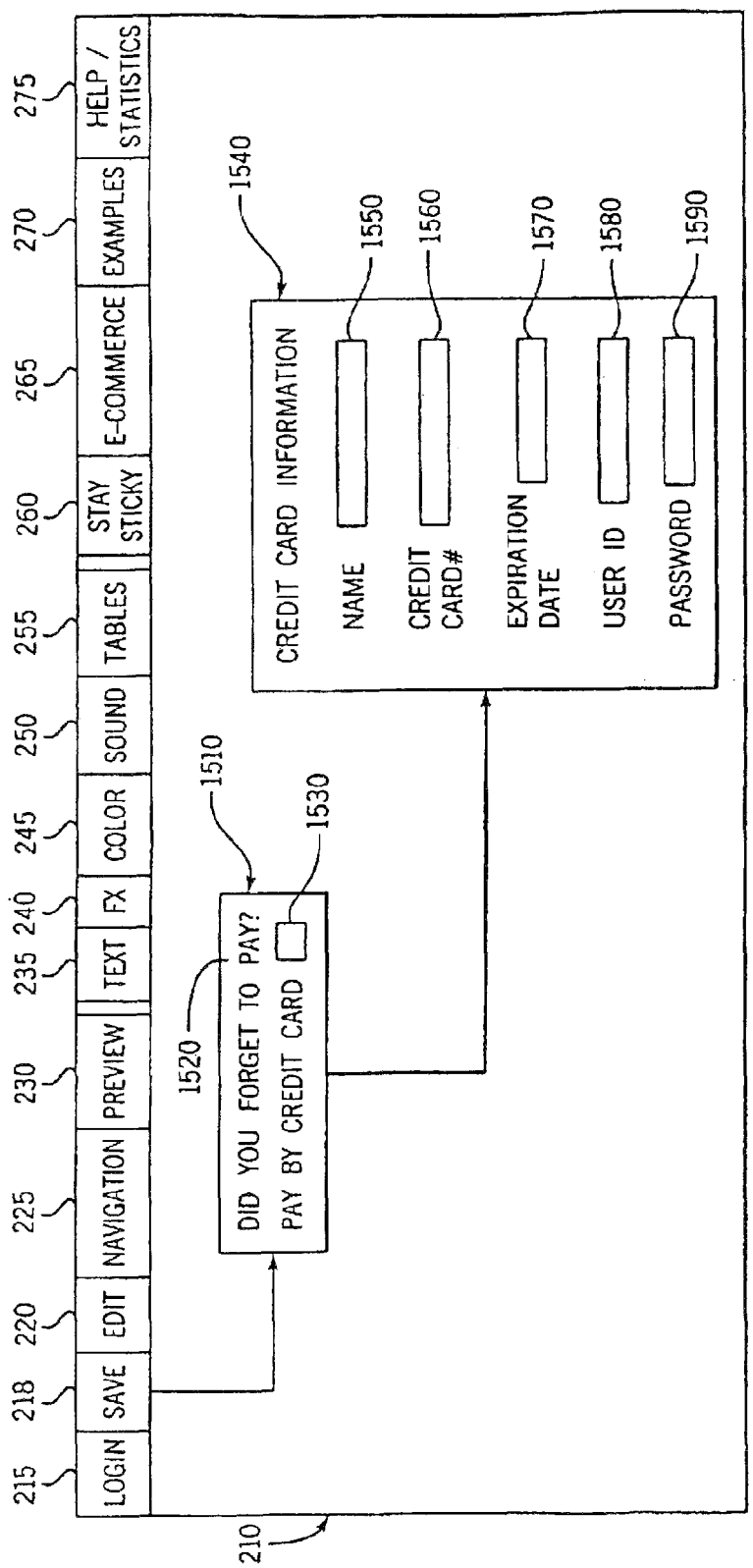
FIG. 15 illustrates providing payment (including credit card) information when attempting to save website information assembled on the website design plate.

The server computer 140 preferably has or is coupled to a third party user database 160, a web assets database 170, and a programming database 190. The third party user database 160 preferably includes a listing of all third party users registered to access the server computer 140. Specifically, information provided during the log in process by registered users is included in the third party user database 160. Also, information regarding websites that have been or are being designed by registered users can be saved (as discussed with reference to FIG. 15) in the third party user database 160. Moreover, third party user database 160 preferably includes a listing of third party authors who have uploaded web assets to the web assets database 170 for use by the registered users in creating their websites, and who have been authorized by the system 100 to receive payment for the use of their web assets by the registered users. Web assets database 170 stores a catalog of web assets uploaded by third party authors. In addition, web assets that are stored in web assets database 170 can include web assets that are derived from other sources, such as web assets designed by the operator of the server computer 140. System 100 automatically compensates a third party author whose uploaded web asset has been distributed to a registered user. When system 100 posts a web page having a web asset uploaded by a third party author on behalf of a registered user, the system 100 credits the credit card account of the third party author in compensation for the use of the web asset. Specifically, the server computer 140 contacts the credit card company 150 corresponding to the third party author's credit card and submits a credit over the internet 130 to the credit card company 150.

Figure 2:
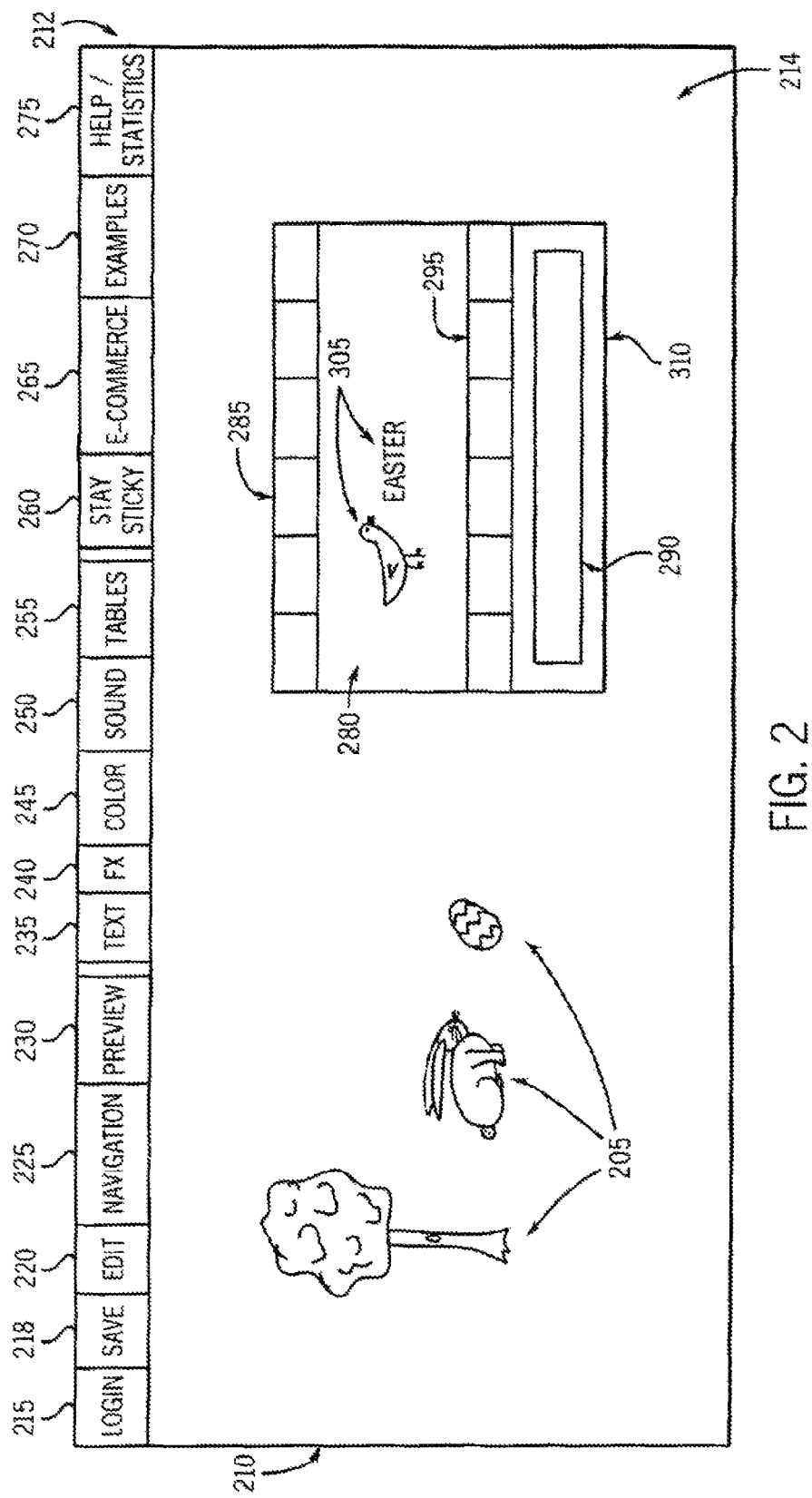
FIG. 2 illustrates an exemplary graphical user interface (GUI), including a website design plate and a STICKY PAD™, which is employed in performing the method of the present invention.

Referring to FIG. 2, the present invention employs a graphical user interface (GUI) to allow a registered user to easily develop a website comprising one or more web pages. In one embodiment, all or nearly all of the programming required to operate the GUI is stored on programming database 190, and is accessed by potential customers and registered users by way of their web browsers (and is viewed via the internet 130 when needed by those potential customers and registered users). However, in the preferred embodiment, the programming required to operate the GUI is provided to potential customers and registered users as software (i.e., on a floppy disk or a CD-ROM), and is stored directly in the programming database 190. Potential customers are capable of interacting with the GUI to perform certain website design functions by logging into computer 140. However, key functions such as searching for web assets, and saving/submitting a fully-designed website for posting on the internet 130, can only be performed once the potential customers have logged into the server computer 140 and become registered users such that they have full access to the server computer 140 via the internet 130. Hereinafter (except with respect to FIG. 11 concerning the log in process), all discussion regarding use of the GUI will concern use of the GUI by registered users at registered user computers 180; however, it should be understood that third party potential customers can also perform limited functions with respect to the GUI before logging into the system 100.

The GUI is provided on a display at the registered user computer 180 and includes a primary display screen, which is termed a STICKY WEB™ website design plate 210 (or web design plate) (STICKY WEB™ is a trademark of the Perfect Web Corporation, of Delray Beach, Fla.). Website design plate 210 has a plurality of selection buttons 212, which in the preferred embodiment include a log in button 215, a save button 218, an edit button 220, a navigation button 225, a preview button 230, a text button 235, an fx button 240, a color button 245, a sound button 250, a tables button 255, a STAY STICKY™ button 260, an e-commerce button 265, an examples button 270 and a help/statistics button 275. In one embodiment, a registered user selects or actuates selection buttons 212 by pointing at the buttons using a mouse of the registered user computer 180, and clicking on the mouse. In alternate embodiments, a registered user can select or actuate selection buttons 212 by providing appropriate keystrokes on a keyboard of the registered user computer 180, by appropriately touching a touch screen of the registered user computer, or by providing an input signal at another conventional type of input device known in the art.

In addition to selection buttons 212, website design plate 210 further includes a design space 214 in which can be displayed one or more web assets 205, which together form a web page. Web assets can include JAVA applets, scripts (including moving scripts and scripts written in a variety of internet languages such as PERL, CGI, SQL, JAVA, XML and HTML), stock art, clip art, digital art, background images, textures, GIF, JPEG, TIF, BMP, chat rooms, message boards, web objects, buttons, templates, themes, fading color, mouse over effects, borders, buttons, shadows, icons, internet designs, sounds, music, etc. In general, web assets are graphic images, including text and related color, sound and animation features, which can be displayed on a website. When displayed for a registered user who has logged into the system 100 (as discussed with reference to FIG. 11), the web assets are interactive, i.e., information can be exchanged between the registered user and the system 100 via the web assets.

Figure 3:
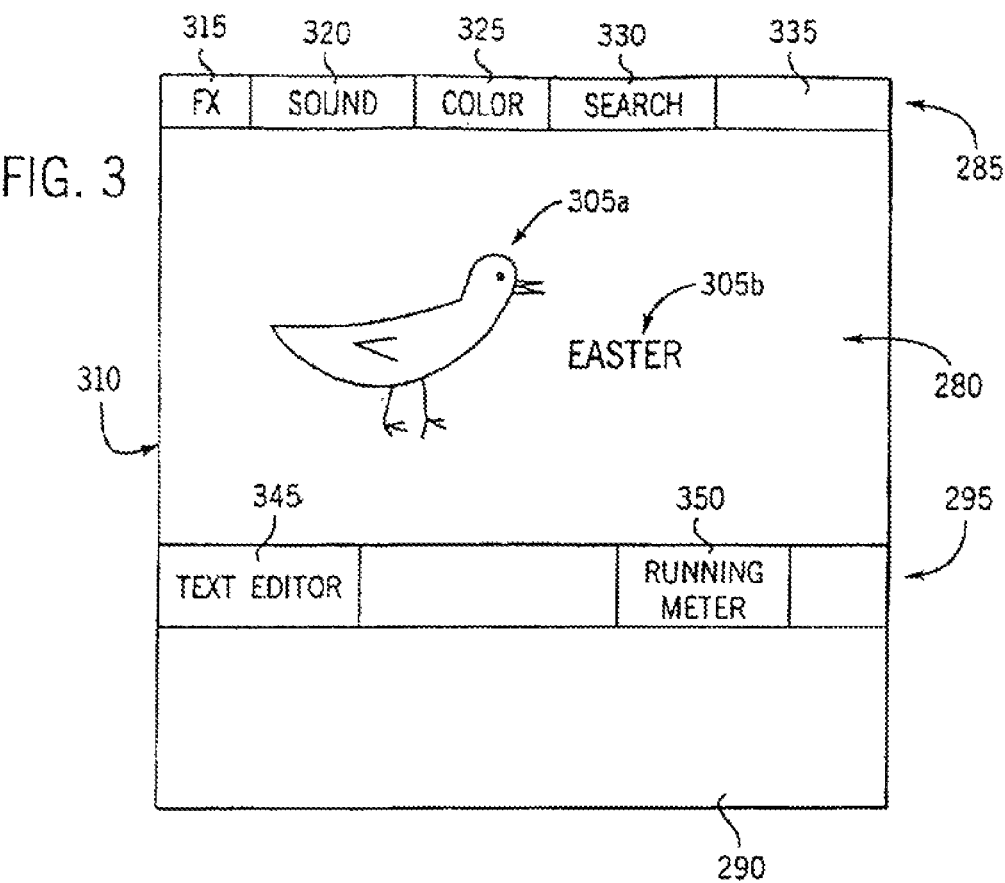
FIG. 3 illustrates in greater detail the STICKY PAD™ of the GUI of FIG. 2.

As shown in FIG. 2, during design of a website using the GUI, a second display screen, termed a STICKY PAD™ 310, is often shown within (or over) website design plate 210 (STICKY PAD™ is a trademark of the Perfect Web Corporation, of Delray Beach, Fla.). STICKY PAD™ 310 includes a design space 280 on which one or more web assets 305 can be displayed. Web assets 305 can be manipulated on the STICKY PAD™ 310, which acts as the editing platform for the registered user and appears when it is necessary to edit or otherwise modify web assets. STICKY PAD™ 310 further includes a plurality of selection buttons 285, 295, which are selected by a registered user in the same manner as selection buttons 212 are selected. As shown in FIG. 3, buttons 285 include an fx button 315, a sound button 320, a color button 325 and a search button 330, and buttons 295 include a text editor button 345 and a running meter button 350, in one embodiment of the invention. Buttons 285, 295 are described in further detail with reference to FIGS. 4-9. STICKY PAD™ 310 additionally includes, in certain embodiments, a banner bar 290. Banner bar 290 is capable of displaying one or more banner ads corresponding to other websites designed by other registered users through the use of system 100, which allow for marketing of those websites. Also, banner bar 290 is capable of displaying banner ads corresponding to outside advertisers.

Figure 4:
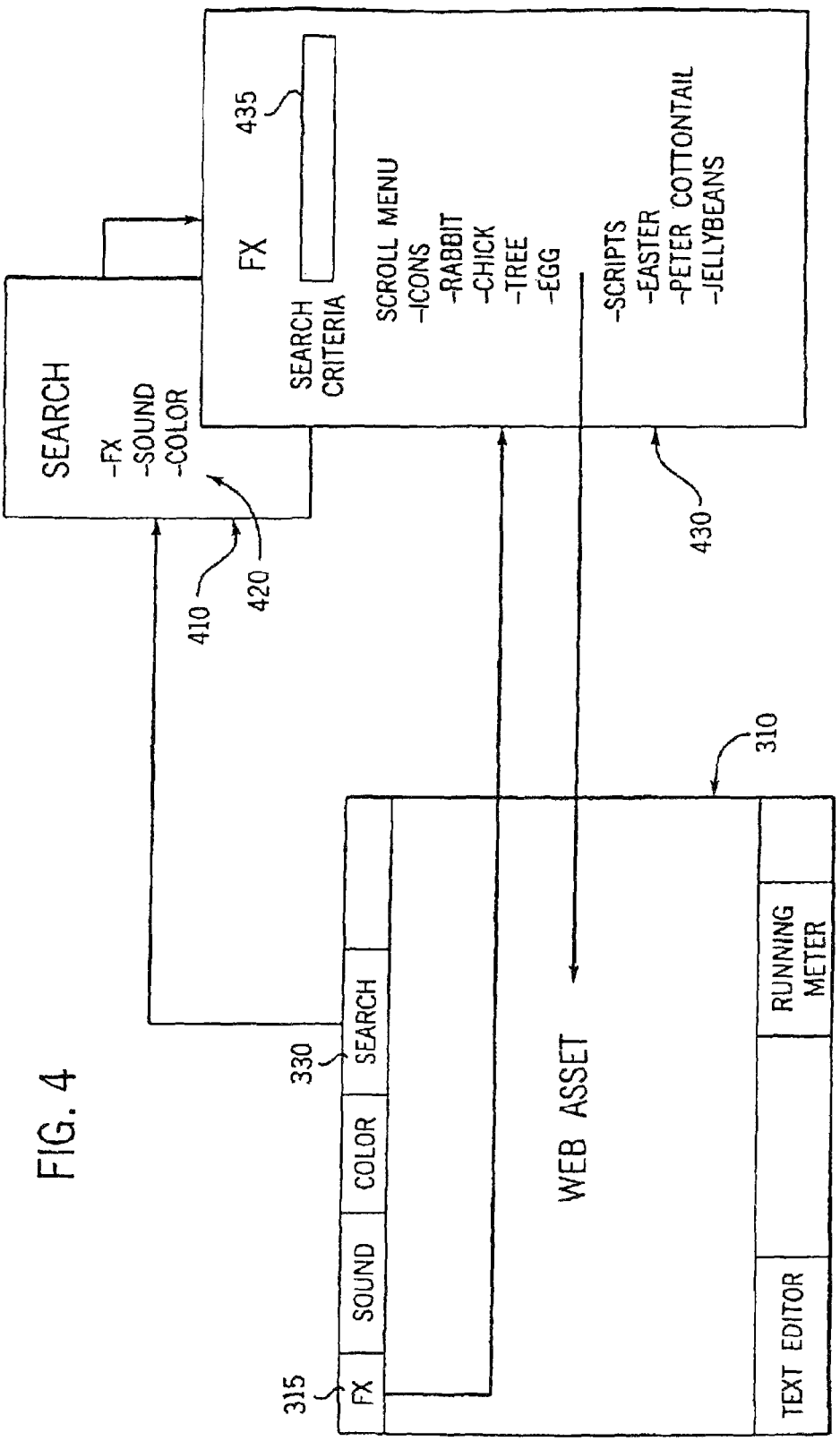
FIG. 4 illustrates searching for graphic images ("web assets" or "fx") using the STICKY PAD™.
Figure 5:
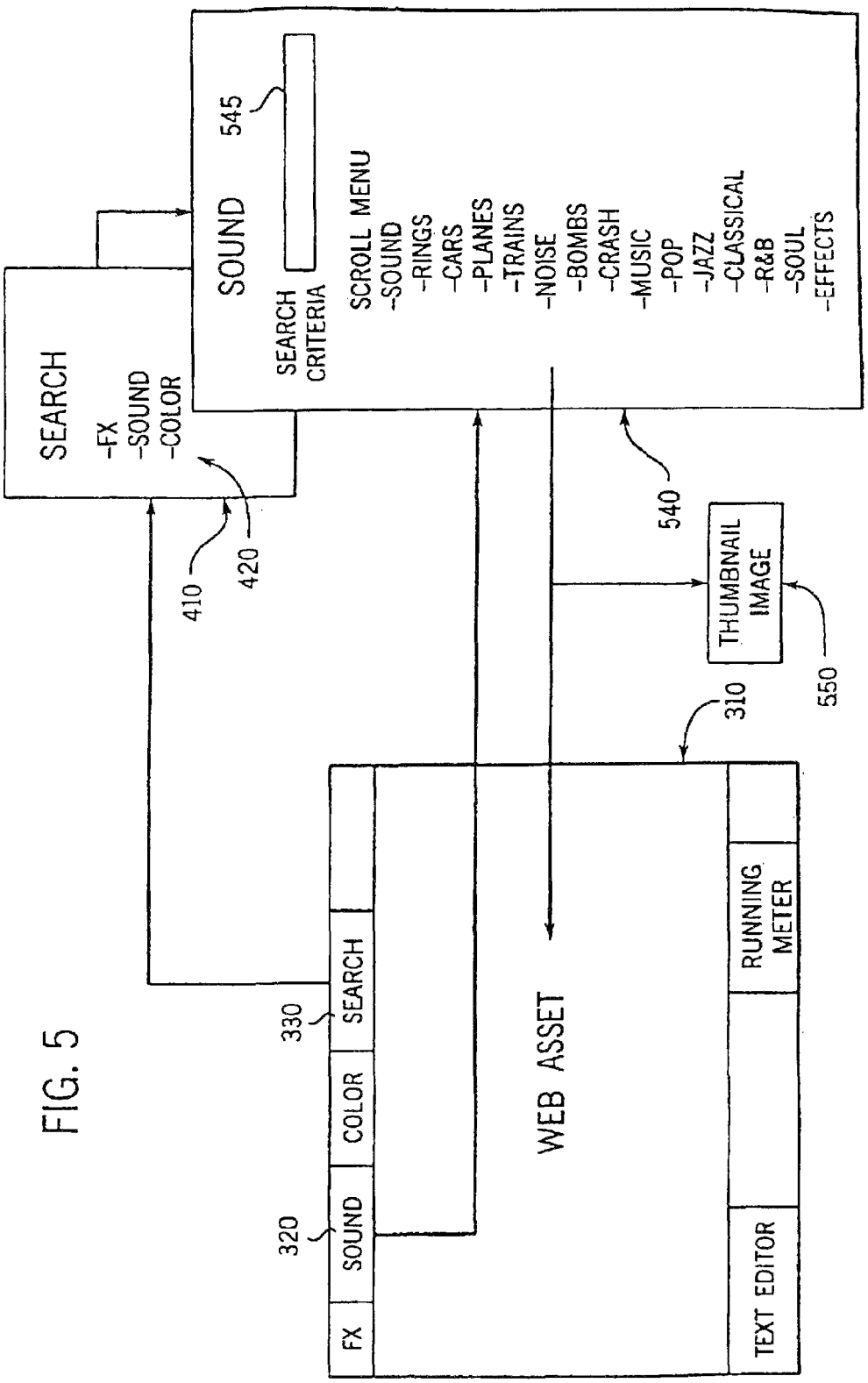
FIG. 5 illustrates searching for sounds using the STICKY PAD™.
Figure 6:
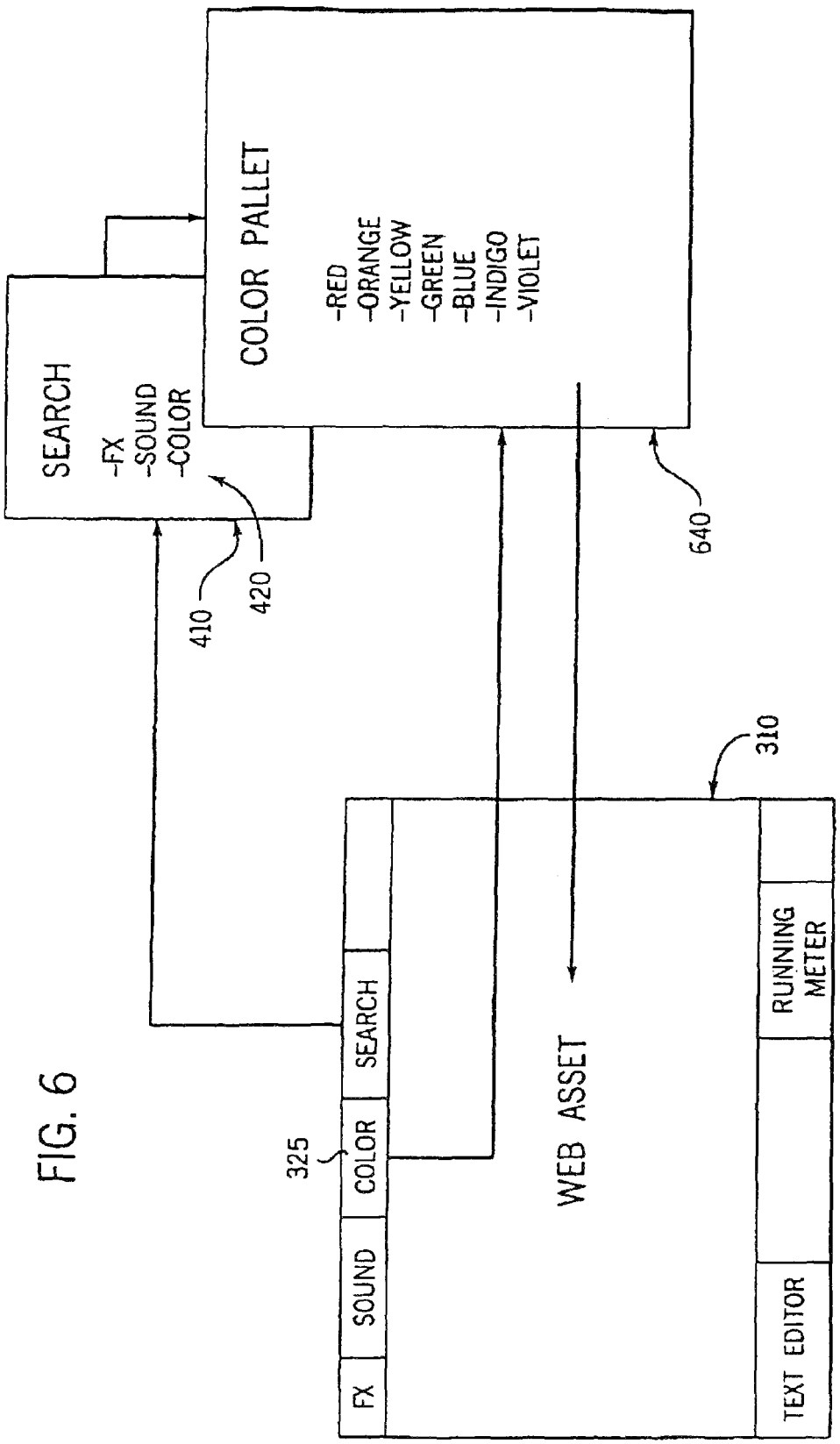
FIG. 6 illustrates searching for colors using the STICKY PAD™.

A registered user can interact with STICKY PAD™ 310 to perform a variety of operations. The registered user can select (by way of a mouse or other input device) any of the web assets 305 that are currently shown on the STICKY PAD™ 310, move the web assets relative to one another, and alter the size of the web assets. Referring to FIGS. 4-6, the registered user also can select search button 330 to identify and obtain new web assets and other elements, including sound elements and color elements, which can be added to the website that is being developed. Upon selecting search button 330, a search menu 410 appears having selectable options 420 for fx (web assets), sound and color. As shown in FIG. 4, if the registered user selects fx (web assets) from search menu 410, an fx menu 430 appears. As shown in FIG. 5, if the registered user selects sound from search menu 410, a sound menu 540 appears. As shown in FIG. 6, if the registered user selects color from search menu 410, a color pallet 640 appears. To streamline operation of the STICKY PAD™ 310, the STICKY PAD™ further includes individual fx, sound and color buttons 315, 320 and 325 which, when selected, result in the immediate display of fx menu 430, sound menu 540 and color pallet 640.

In the preferred embodiment, fx (web assets) menu 430 includes a search entry field 435 in which the registered user can enter keywords or other search criteria indicative of the type of web assets that the registered user desires to implement within its website. Upon receiving search criteria from the registered user, the system 100 (particularly the server computer 140) searches the web assets database 170 for web assets that meet the search criteria. System 100 employs any of a number of conventional search engines to perform the searches. Upon the commanding of a search by the registered user, the fx menu 430 lists all available web assets that meet the search criteria in a scroll menu, as shown in FIG. 4. Also in the preferred embodiment, sound menu 540 includes a search entry field 545 in which the registered user can enter keywords or other search criteria indicative of the type of sounds that the registered user desires to implement within its website. Upon receiving search criteria from the registered user, the system 100 performs a search for sounds meeting the search criteria and then lists all available sound elements that meet the search criteria in a scroll menu, as shown in FIG. 5.

Fx menu 430 and sound menu 540 typically list available elements in categories. For example, for fx/web assets, the categories can include icons, scripts, chat rooms and message boards and, for sound elements, the categories can include general sounds, noises, music and sound effects. Although in the preferred embodiment, fx menu 430 and sound menu 540 list web assets and sound elements that are identified based upon searches of web assets database 170 and meet search criteria specified in search entry fields 435, 545, in alternate embodiments searches need not be performed. In such embodiments, fx menu 430 and sound menu 540 directly list all available web assets and sound elements that are available for implementation into a website, without receiving search criteria from the registered user. Further, with respect to color pallet 640, in the preferred embodiment the color pallet lists all available colors without receiving search criteria from the registered user or performing any searches to narrow down the list of available colors. However, in alternate embodiments, color pallet 640 can include a search entry field for receiving search criteria from the registered user and, upon performing a search, display colors that meet the specified search criteria.

Once fx menu 430, sound menu 540 and color pallet 640 list available web assets, sound elements and color elements, respectively, the registered user can select one or more of the elements for implementation in the registered user's website (i.e., by selecting one or more of the elements using a mouse). The registered user can, upon selecting a web asset, sound or color, cause the selected element to appear within design space 280 of STICKY PAD™ 310 (i.e., by double-clicking on the element using a mouse). The registered user also can apply selected web assets, sound elements or color elements to existing web assets or other elements within STICKY PAD™ 310. The registered user applies the selected elements to existing elements within the STICKY PAD™ 310 by dragging and dropping the selected elements onto the existing elements. In the preferred embodiment, sound and color elements can be dragged, dropped and otherwise manipulated around the STICKY PAD™ 310 in the same manner as web assets; when the registered user selects a sound or color element, the selected sound or color element is displayed as an icon or thumbnail image 550.

For example, once a chick icon has been selected from fx menu 430 and is displayed in design space 280 as web asset 305a (as shown in FIG. 3), the registered user can further modify the chick to make a peep or other noise by selecting the desired noise from sound menu 540, dragging the noise to the chick, and dropping the noise onto the chick. If the color of the chick as obtained from fx menu 430 is not the desired color, i.e., the color is white and not yellow, the registered user can further modify the color of the chick by selecting the color yellow from color pallet 640, dragging the color to the chick, and dropping the color onto the chick. Although in the preferred embodiment, sound and color elements can be dragged and dropped in the same manner as web assets, in alternate embodiments, a registered user can instead apply a particular sound or color element to an existing element within the STICKY PAD™ 310 simply by selecting the existing element before (or immediately after) selecting the particular sound or color element. The web assets, sound elements and color elements displayed in fx menu 430, sound menu 540 and color pallet 640, respectively, are provided from server computer 140, which accesses web assets database 170. Web assets database 170 stores web assets that are provided from a variety of sources including internet companies, publishers, geeks, designers, and artists. In the preferred embodiment, some of the web assets stored on web assets database 170 are provided from independent third party authors who access system 100 by way of third party author computers 120. System 100 compensates the independent third party authors when their web assets are utilized by registered users in designing websites. Web assets can also be provided under license from major digital and stock art publishers (i.e., Adobe, Corel, Corn Stock, etc.). Although the system 100 is designed to allow the registered user to obtain web assets and sound and color elements from web assets database 170, the system also allows the registered user to obtain web assets from other sources. For example, the registered user can upload its own web assets from a memory device (i.e., the hard drive) of registered user computer 180. Also, in certain embodiments, the registered user can obtain web assets by independently accessing third party websites via the internet, and selecting web assets displayed on those websites.

Figure 7:
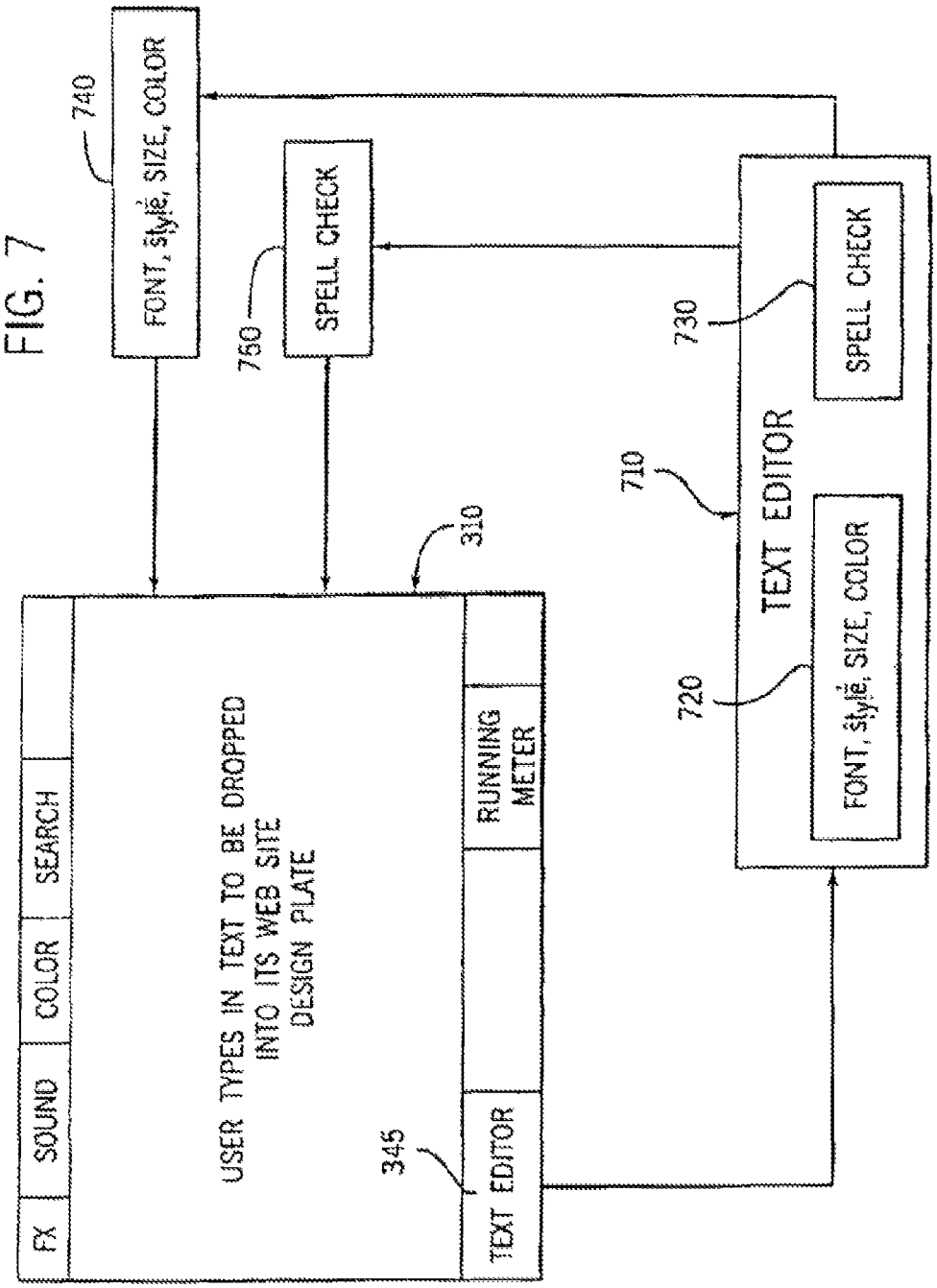
FIG. 7 illustrates text editing using the STICKY PAD™.

The web assets that can be selected from fx menu 430 include web assets that consist partly, or even entirely, of text. However, STICKY PAD™ 310 further allows a registered user to enter text directly into the STICKY PAD™ by typing in the desired text at a keyboard at registered user computer 180. The text is displayed within design space 280 of the STICKY PAD™ 310 once the registered user hits the "enter" key on the keyboard. In certain embodiments, text that is desired for entry into the STICKY PAD™ 310 can be uploaded from a memory associated with registered user computer 180 rather than typed in by the registered user. Once the text is displayed within the design space 280, the text can be selected by the registered user and moved around within design space 280 like any other web asset. The text can also be edited if the registered user selects the text editor button 345. As shown in FIG. 7, upon the selection of text editor button 345, a text editor menu 710 appears. Displayed on text editor menu 710 are a font/style/size/color button 720 and a spell check button 730. Upon selection of the font/style/size/color button 720, a font/style/size/color menu 740 appears, from which the registered user can select a plurality of fonts, styles and colors for the text as well as select a size setting for the text.

Upon selection of the spell check button 730, a spell check is performed using computer algorithms that are well known in the art. In one embodiment, a spell check result box 750 appears once the spell check has been performed in relation to the text, and suggested changes to the text appear in the spell check result box. In alternate embodiments, the spell check is executed without the display of any spell check result box. For example, if a spelling error is detected in the text, the spelling error is highlighted in the text itself. The registered user can identify which text is to be edited in a variety of ways. In one embodiment, the registered user must select the text (i.e., highlight the text, using a mouse) that is to be edited, and then subsequently select text editor button 710. In another embodiment, the registered user first selects text editor button 710 and then subsequently selects the text that is to be edited.

Figure 8:
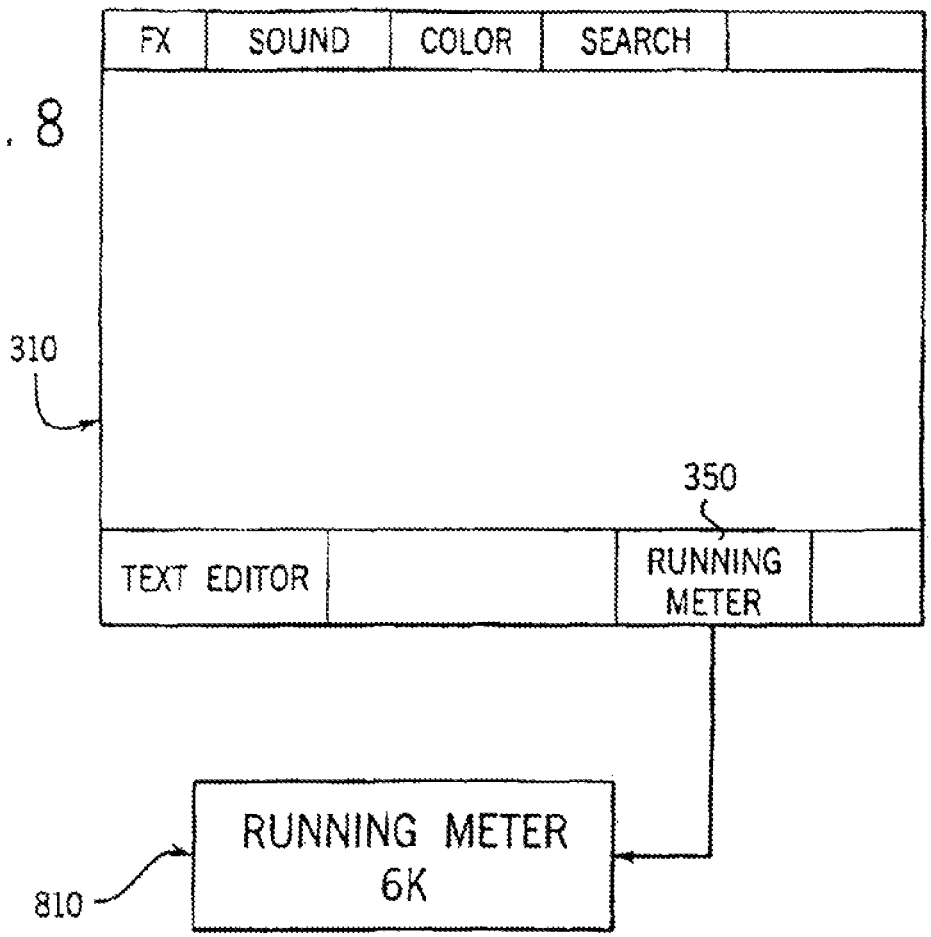
FIG. 8 illustrates the operation of a running meter on the STICKY PAD™.

Referring to FIG. 8, STICKY PAD™ 310 additionally includes running meter button 350. Upon being selected by the registered user, running meter button 350 provides a running meter block 810 that shows an indication of the size of the web asset(s) that are displayed on STICKY PAD™ 310. As shown in FIG. 8, in one embodiment, the indication provided by running meter block 810 is an indication (preferably displayed on a single line of text) of the memory required for storing the web assets. In alternate embodiments, other or additional information can be displayed by running meter block 810, e.g., the time required to download or execute the web assets. In the preferred embodiment, this other information is not displayed by way of selecting running meter button 350 of STICKY PAD™ 310, but is displayed by way of help/statistics button 275 of website design plate 210, as described below with reference to FIG. 14. Although in the present embodiment, size information is only displayed when running meter button 350 is selected by the registered user, in alternate embodiments the running meter button is replaced by a running meter display region, which always displays the total size of all web assets currently being displayed in display region 280.

In the preferred embodiment, the web assets that are selectable by a registered user are standardized to facilitate the registered user's creation of a website that operates in an efficient and user-friendly manner and, in particular, does not require too much memory or require excessive time to be downloaded from the internet. Thus, in the preferred embodiment, an authenticating team reviews all web assets that are provided from third party authors before the web assets are stored on web assets database 170 and accessible by registered users in designing their websites. The authenticating team only allows web assets that do not exceed a maximum kilobytes (K) allowed per web asset and web page to be stored on the web assets database 170. In addition to storing information concerning the characteristics of the web assets, web assets database 170 also stores accounting information regarding the usage of the web assets stored on the web assets database. At the end of each time period (i.e., month or quarter), the server computer 140 reviews the accounting information and determines the amount of usage of each of the web assets by each registered user. The web asset usage is assigned a cash amount per use so that a total amount of money owed by each registered user can be calculated (and charged to each respective registered user).

Figure 9:
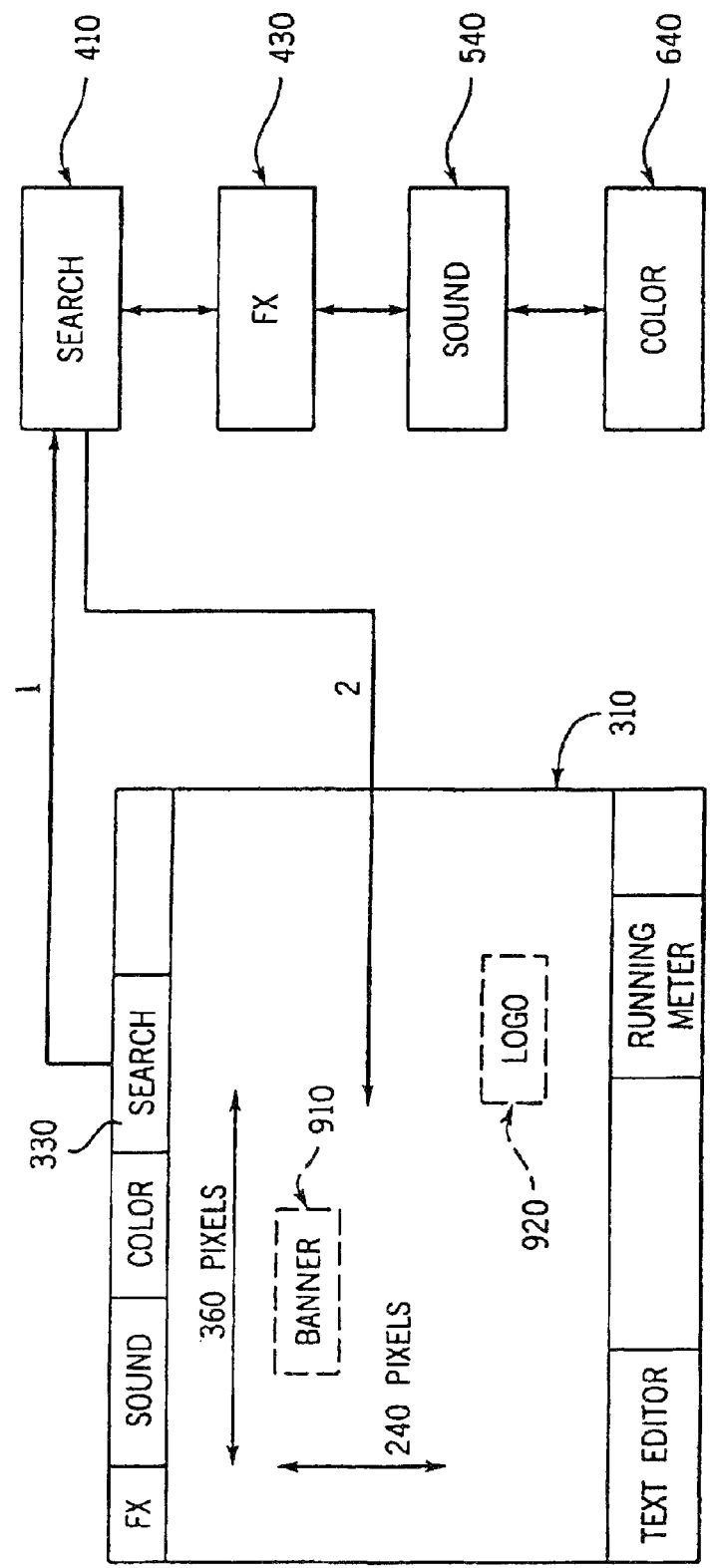
FIG. 9 illustrates the creation of a banner ad and a logo using the STICKY PAD™.

Turning to FIG. 9, a registered user can utilize STICKY PAD™ 310 to design a banner ad 910 to be used to advertise the registered user's website. The registered user can search for a desired banner ad design by selecting search button 330 and then selecting fx from search menu 410 (or simply by selecting fx button 315), to obtain fx menu 430, at which a search can be requested. In n the fx menu 430, all available banner ads have standard size configurations, namely 240.times.360 pixels or 240.times.240 pixels. As with respect to other web assets that are displayed within STICKY PAD™ 310, the banner ad 910 that is being developed using the STICKY PAD™ can be moved within the design space 280 and modified through the addition of other web assets (including text), which are obtained by selecting search button 330 (or fx button 315) and bringing up fx menu 430. Also, the banners can be modified through the addition of sounds and colors, which are obtained by selecting search button 330 (or by selecting sound and color buttons 320 and 325, respectively) to bring up sound menu 540 and color pallet 640, respectively.

Also as shown in FIG. 9, the registered user can utilize STICKY PAD™ 310 to design a logo 920 for the registered user's website. As with respect to the design of banner ads, the registered user can search for a desired logo design in, and select the desired logo design from, fx menu 430. Alternatively, the registered user can upload an already-designed logo from a memory device at registered user computer 180 (e.g., the registered user's hard drive) into STICKY PAD™ 310. The selected or uploaded logo can then be further edited and modified within the STICKY PAD™ 310, for example, through the addition of other web assets (including text), sounds and colors. Although in the present embodiment logos and banner ads are designed using the same searching and design procedures that are employed in the design of other website elements, in other embodiments STICKY PAD™ 310 and/or website design plate 210 have specific "logo design" and "banner design" buttons that the registered user can select to design logos and banner ads, respectively.

When the registered user finishes developing and modifying the web assets in the design space 280 of the STICKY PAD™ 310, the registered user drags and drops (i.e., using a mouse) the web assets into website design plate 210. In alternate embodiments, the registered user can provide a command to the system 100 to terminate the display of the STICKY PAD™ 310, at which time all of the elements being displayed in the STICKY PAD™ appear in the website design plate 210. When the web assets are dropped into website design plate 210, the web assets become interactive (as long as the registered user has logged in to the system 100, as discussed with reference to FIG. 11). That is, the web assets become functional so that the registered user is able to exchange information with respect to the web assets, i.e., interact with system 100 through the use of the web assets. When dropped into website design plate 210, the web assets form or are added to a particular web page of the website being developed.

Figure 10:
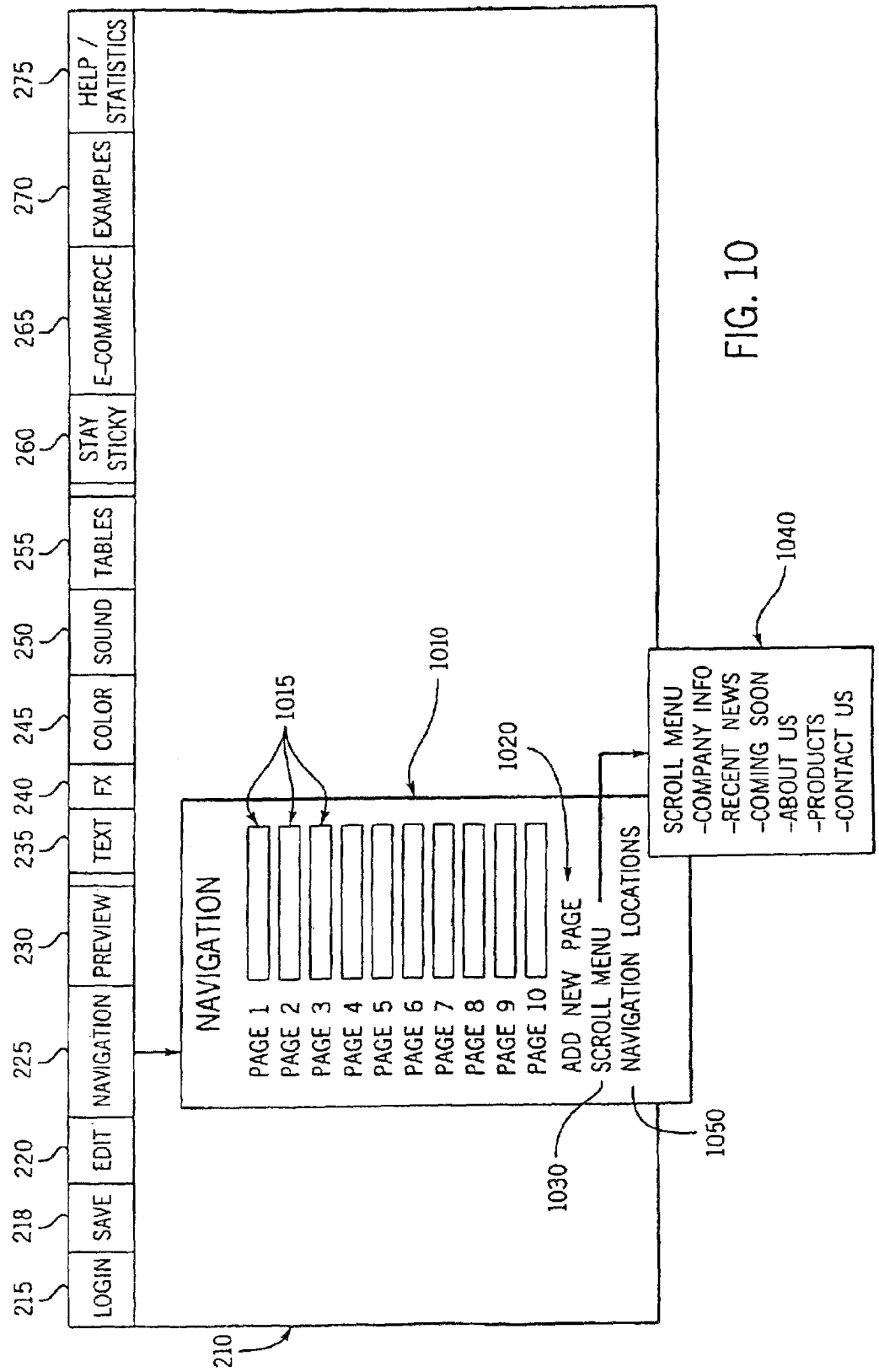
FIG. 10 illustrates the generation of a web site outline using the navigation feature of the website design plate.

A website that is being developed typically will have more than one web page. As shown in FIG. 10, the registered user can provide information to the system 100 indicating the number of web pages in the website, as well as determine the web page that is currently being displayed by website design plate 210, by selecting navigation button 225 on website design plate 210. Upon selecting navigation button 225, a navigation menu 1010 appears. Navigation menu 1010 includes a list of web pages 1 through 10. In alternate embodiments, navigation menu 1010 can list fewer or greater than ten web pages. Adjacent to the web page numbers are fields 1015 for inputting names/identifiers for the respective web pages. The registered user can input a name/identifier corresponding to each of web pages 1-10 by selecting the respective field 1015 (i.e., by way of a mouse) and typing in the name/identifier. The registered user determines which web page is currently being displayed by website design plate 210 by selecting one of the page numbers in the list. In certain embodiments of the invention, the website design plate 210 always displays a web page number indication corresponding to the web page that is currently being displayed, for example, at a corner of design space 214.

Websites that are designed using the system 100 are not limited to ten web pages. As shown in FIG. 10, the registered user can select an add new page button 1020 on navigation menu 1010 to add additional pages (and to provide names/identifiers corresponding to those additional pages). Also, although the registered user can type in original names/identifiers corresponding to the web pages (e.g., in fields 1015), the registered user can also utilize standard names/identifiers by selecting a scroll menu button 1030. Upon selecting scroll menu button 1030, a scroll menu 1040 appears that lists various standard web page names/identifiers such as, for example, Company Information, Recent News, Coining Soon, About Us, Products, and Contact Us. Navigation menu 1010 further includes a navigation locations button 1050. Upon selecting the navigation locations button 1050, the registered user is able to determine where a navigation bar or website map/outline will be positioned on one or more web pages of the website (e.g., at the top, bottom, left or right). The navigation bar or website map/outline allows website users to visualize the website as a whole and the various web pages that are available for access by the website users.

As discussed, the STICKY PAD™ 310 acts as the editing platform for the registered user, and appears when it is necessary to edit or otherwise modify web assets. During development of a website, the registered user can select (by way of a mouse or other input device) one or more of the web assets 205 that are displayed on website design plate 210 to activate STICKY PAD™ 310 and allow editing of the selected web assets, which appear in design space 280. If an item of text within the design space 214 is selected by the registered user, both the STICKY PAD™ 310 and then the text editor menu 710 appear to allow for editing of the text. STICKY PAD™ 310 also appears when the registered user proceeds with a search to obtain a desired web asset by selecting the fx button 240. Upon the selecting of the fx button 240 by the registered user, the fx menu 430 appears, and the registered user can search for and select a desired web asset. Once the registered user selects a desired web asset from the fx menu 430, the STICKY PAD™ 310 appears with the selected web asset being displayed in design space 280.

Additionally, STICKY PAD™ 310 appears when either the color or sound buttons 245, 250 are selected by the registered user. Upon the selecting of the color or sound buttons 245, 250 by the registered user, the color pallet 640 or sound menu 540 appear, respectively. Once the registered user selects a desired color or sound from the color pallet or sound menu, respectively, the STICKY PAD™ 310 appears with a thumbnail image 550 representing the selected color or sound being displayed in design space 280. Further, STICKY PAD™ 310 appears when the text button 235 of website design plate 210 is selected. When text button 235 is selected, the STICKY PAD™ 310 immediately appears and the registered user is allowed to type in text at the keyboard of registered user computer 180. Text editor button 345 can then be selected by the registered user from the STICKY PAD™ 310 to edit the text.

Figure 11:
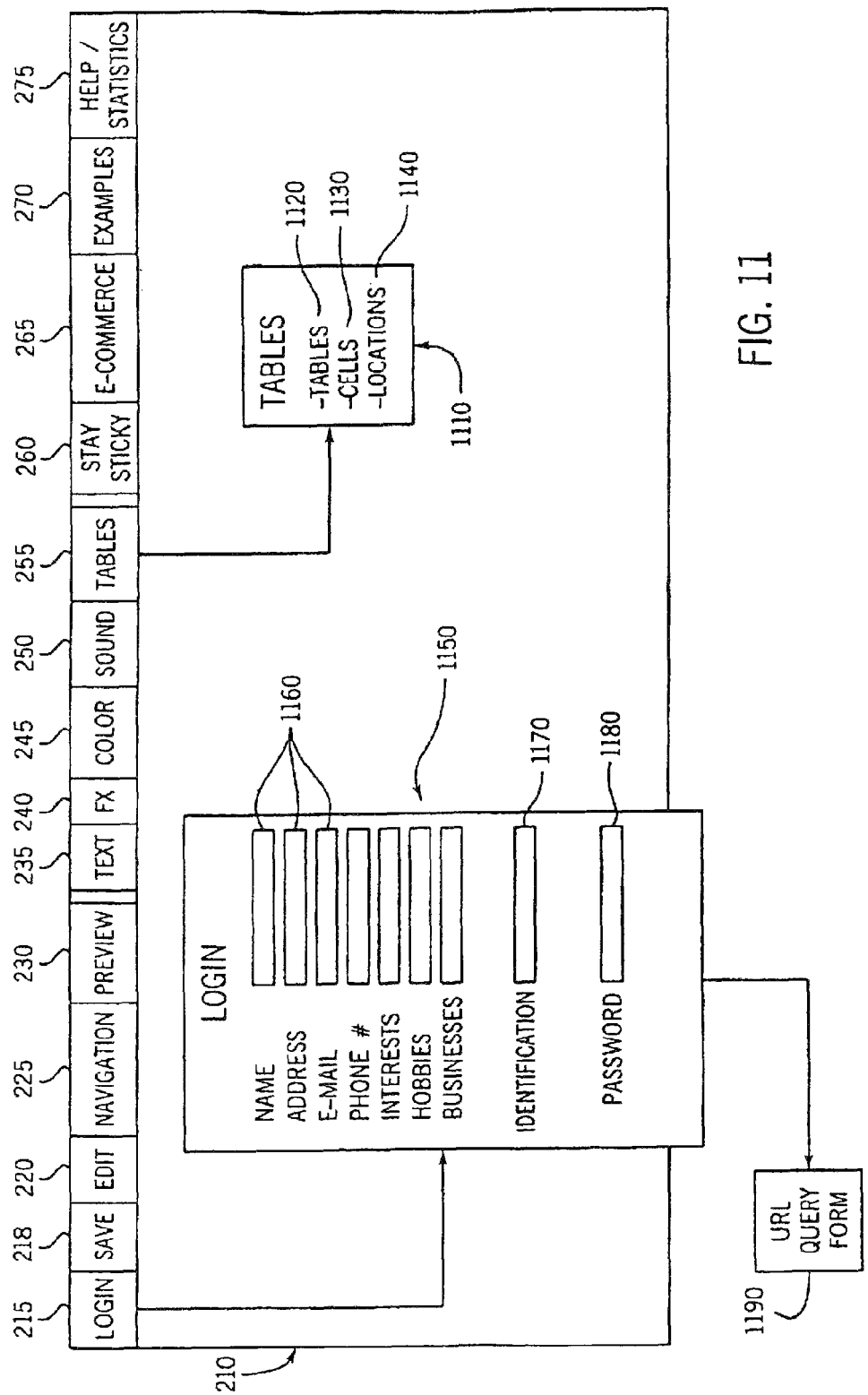
FIG. 11 illustrates providing log in information and generating a table/cell at the website design plate.

In addition to web assets (from fx menu 430), sounds, colors and text, the GUI of system 100 is also capable of adding tables and cells to the website being designed in order to provide depth and perception to the website. As shown in FIG. 11, when tables button 255 is selected by the registered user, a tables menu 1110 appears. The registered user can then select from the tables menu 1110 one or more tables 1120 and cells 1130, and also specify the locations of the tables/cells on a web page by selecting a locations button 1140. In one embodiment, the possible locations of tables/cells on a web page include a top location, a bottom location, a left location and a right location. Unlike the editing of web assets, sounds, colors and text, in the preferred embodiment STICKY PAD™ 310 does not appear upon the selection of tables button 255. Rather, once a table/cell is selected, the registered user can drag and drop the selected table/cell directly into website design plate 210.

Upon being dropped into the website design plate 210, the table/cell automatically aligns at an edge of the design space 214, with the appropriate edge being determined by the location selected by the registered user. Also upon being dropped into the website design plate 210, the table/cell becomes interactive. The registered user can move the table/cell from its original location, and also can adjust the size of the table/cell by selecting the table/cell (i.e., by way of a mouse) and stretching or contracting the boundaries of the table/cell. Web assets and other elements can be dragged and dropped both from STICKY PAD™ 310 and from other locations on website design plate 210 into tables and cells, and the color of tables/cells can be modified by selecting color button 245. Tables differ from cells in that cells typically form enclosed areas within tables. Cells cannot be moved outside of (or moved to overlap) a table boundary enclosing the cells. In alternate embodiments, tables/cells can be created and modified by way of the STICKY PAD™ 310.

Further shown in FIG. 11 is a log in menu 1150 that appears upon the selection of log in button 215 by a potential customer. In the preferred embodiment of the invention, several features of the GUI can be operated before completion of the log in process, such as uploading web assets from a hard drive of a third party potential customer computer 110 into the website design plate 210. However, key functions such as searching for web assets, and saving/submitting a fully-designed website for posting on the internet can only be performed by registered users who have full access to the server computer 140 via the internet. To obtain full access to the server computer 140 and perform such functions, log in information must be provided to the system 100. By requiring this log in information, the system 100 can monitor the activity of the registered users and bill the registered users for their usage of the system, including their usage of web assets provided from third party author computers 120 and saved on web assets database 170. Additionally, the information provided by registered users during the log in process can be used by the system 100 to determine appropriate markets for the registered users' websites. The use of this market information is discussed further in reference to FIG. 12.

As shown in FIG. 11, the selection of log in button 215 brings up log in menu 1150. The log in menu 1150 includes a scroll and input form with multiple fields 1160 that must be filled in to complete the log in process. The fields 1160 can include, for example, fields for the potential customer's (i.e., prospective registered user's) name, address, e-mail address, telephone number, interests, hobbies and businesses. Upon the completing of fields 1160, a desired identification name is further provided into an identification field 1170 and a desired password is provided into a password field 1180. The information from fields 1160-1180 is then provided from the third party potential customer (i.e., prospective registered user) computer 110 via the internet 130 to the server computer 140, where the information is processed and then provided for storage on third party user database 160. Although in the preferred embodiment, the identification name and/or password are chosen by the potential customer, in alternate embodiments, the identification name and password are assigned by the system 100.

Assuming that the information provided into the fields 1160-1180 of log in menu 1150 is not rejected by the server computer 140 (e.g., because information was not entered for some of the fields, or because the e-mail address that was entered is invalid), the server computer logs in the potential customer as a registered user and allows the new registered user to access all of the functionality of the system 100. Also upon successfully logging in the new registered user, the system prompts the new registered user regarding a web address for the registered user's website by displaying a URL query form 1190. The web address typically concludes with any top-level domain name, i.e., .com, .net, etc. The query form is licensed for use on the system 100 from Internic and/or the other five URL registrants. Further, upon successfully logging in to the system 100, the new registered user can thereafter bypass the full log in process when reentering the system by simply inputting its identification name and password into the identification and password fields 1170, 1180. Upon reentering the system 100, the registered user selects edit button 220 on website design plate 210 to cause the registered user's website (in its current state of development) to become interactive. Additionally, upon selecting edit button 220, the registered user can modify any element of the web site that is shown within design space 214 by selecting that element (i.e., by clicking on the element using a mouse) to bring up STICKY PAD™ 310, and then modifying the element within the STICKY PAD™ as discussed above.

Figure 12:
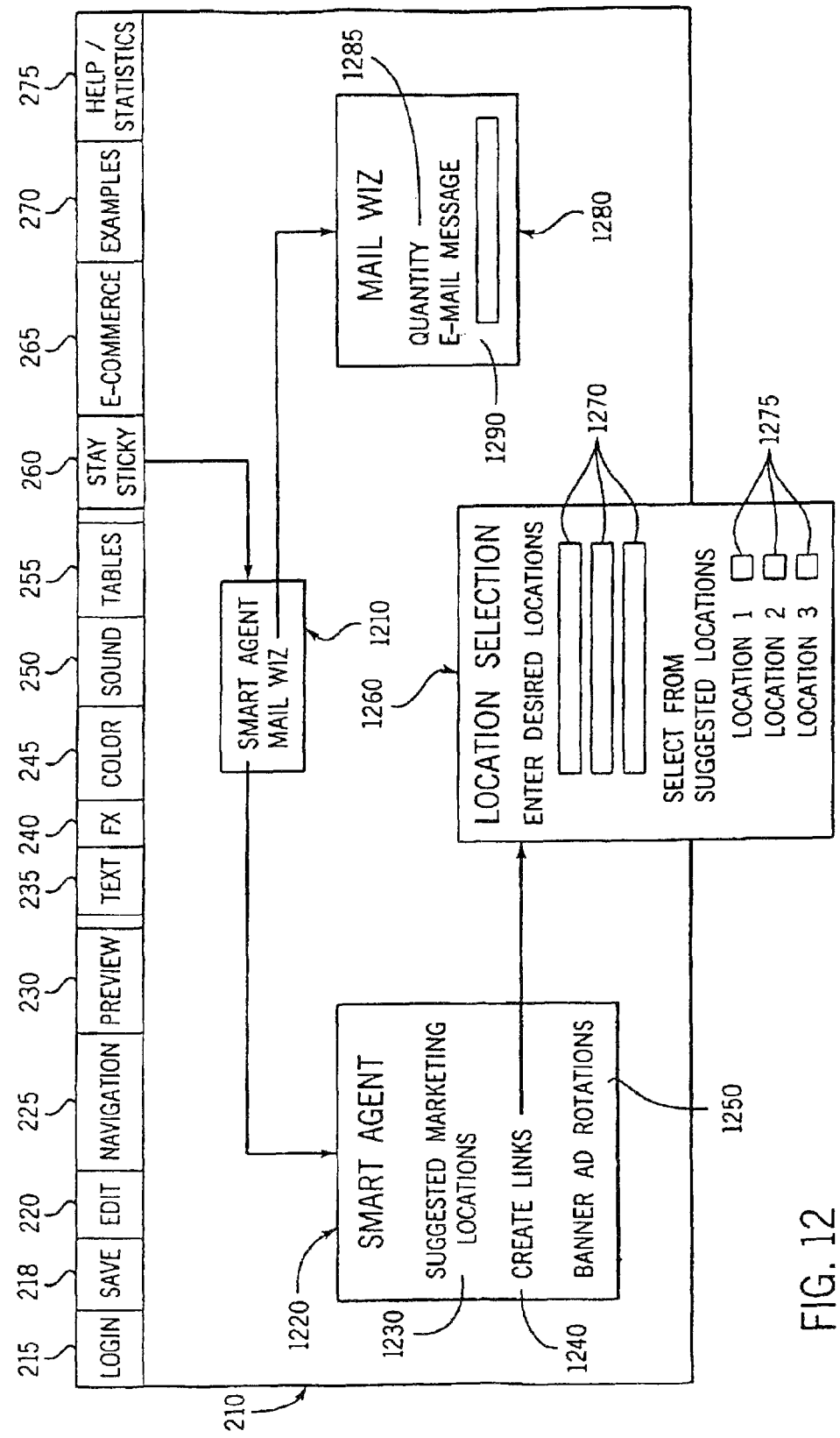
FIG. 12 illustrates the operation of STAY STICKY™ features, including smart agent and MAIL WIZ™ features.

Turning to FIG. 12, website design plate 210 further includes STAY STICKY™ button 260, which brings up a STAY STICKY™ menu 1210 when selected by the registered user (STAY STICKY™ is a trademark of the Perfect Web Corporation of Delray Beach, Fla.). STAY STICKY™ menu 1210 lists STAY STICKY™ features that are available to the registered user in designing and marketing its website. The STAY STICKY™ features provide the registered user with special information concerning, and marketing opportunities with respect to, other registered users who have designed their websites using the system 100. That is, the STAY STICKY™ features provide special marketing benefits to registered users of the system 100 vis-a-vis one another. Specifically, the registered user can select from two options on the STAY STICKY™ menu 1210, smart agent and MAIL WIZ™ (MAIL WIZ™ is a trademark of the Perfect Web Corporation of Delray Beach, Fla.). Upon the selection of the smart agent option from the STAY STICKY™ menu 1210, a smart agent menu 1220 appears. The registered user can select (e.g., by way of a mouse) from among three options on the smart agent menu 1220, a suggested marketing locations option 1230, a create links option 1240, and a banner ad rotations option 1250.

When the registered user selects suggested marketing locations option 1230, the server computer 140 determines the best possible places to market the registered user's website on the internet. That is, the server computer 140 determines other websites on which it would be most beneficial to display a link to, or banner concerning, the registered user's website. The server computer 140 makes this determination based upon the information provided by the registered user during the log in process, particularly the information provided in fields 1160 as described with reference to FIG. 11. Using this information, the server computer 140 searches the information stored in third party user database 160 to identify other websites on which it would be desirable to market the registered user's website. Server computer 140 can utilize any one of a number of search engines that are currently well known in the art to identify such websites using the log in information provided by the registered user. In alternate embodiments, server computer 140 can also access other information other than that within third party user database 160, including information concerning websites or other marketing locations that *e-were not developed through the use of the system 100. Upon determining desirable marketing locations, the system 100 can display the identified marketing locations to the registered user.

Upon selection by the registered user of the create links option 1240, the GUI provides a location selection menu 1260, in which the registered user can identify addresses for websites to which the registered user desires its website to be linked. In the preferred embodiment, the websites can be selected from among the websites that have been created by other registered users using the system 100. Location selection menu 1260 includes several open fields 1270 in which the registered user can specify desired websites. Further, location selection menu 1260 lists the suggested websites that were identified in the search performed by server computer 140 upon selection of the suggested marketing locations option 1230. The list includes selection boxes 1275 that the registered user can check to indicate its selection of the various suggested websites. If the registered user has not yet selected suggested marketing locations option 1230, the server computer 140 performs the search for suggested websites when it generates location selection menu 1260. Once the registered user has selected its desired marketing locations on location selection menu 1260, the system 100 has sufficient information to create links to the registered user's website at other websites.

The registered user can further select the banner ad rotations option 1250 from the smart agent menu 1220. Upon the selecting of banner ad rotations option 1250, the system 100 determines whether the registered user has already designed (or uploaded or otherwise provided to the system) a banner ad, as discussed with reference to FIG. 9. If the registered user has not already designed a banner ad, the system displays a message indicating that it is necessary to create a banner ad in order to participate in banner ad rotations. The system 100 also provides banner ad design options from which the registered user can select a desired banner design. The design options can be obtained by the registered user by using fx menu 430 to perform a search for banner ads. Following selection of a desired banner ad design, STICKY PAD™ 310 appears, allowing the registered user to further modify and then complete its design of the banner ad. Once a banner ad design is completed, a location selection menu identical to location selection menu 1260 appears following selection of the banner ad rotations option 1250. The location selection menu allows the registered user to specify the websites at which the registered user desires its banner ad to appear. Once the registered user has selected its desired locations on the location selection menu, the system 100 has sufficient information to create banner ads advertising the registered user's website at other websites.

By completing these steps relating to the create links option 1240 and/or the banner ad rotations option 1250, the registered user causes its website to participate in linking and/or banner ad display functions with other websites that also were created using the system 100 by registered users who opted to participate in these linking and/or banner ad display functions. Once the design of the new website by the registered user is completed and the new website is posted/activated, the system 100 causes the selected websites of other registered users (i.e., the websites selected during the design of the new website) to display a link and/or banner ad concerning the new website. In the preferred embodiment, each website that is developed by a registered user who opts to participate in the linking functions can display unlimited links to other registered users' websites. If the number of links to be displayed exceeds the available display space on the display screen, links can be rotated on and off the screen. Each website that is developed by a registered user who opts to participate in the banner ad display functions can rotate an unlimited number of banner ads for other registered users' websites. The banner ads can be shown sequentially over a period of time at the registered user's website.

System 100 will cause each website that is designed to participate in the linking and/or banner ad functions to include, on at least one web page of the website, a link region and/or a banner ad region for the display of links to and/or banner ads for other websites. The links displayed in the link region of a given website can change as new websites are created using the system 100 by registered users, or as old websites are deactivated. In certain embodiments, a registered user is allowed to change its selections of desired marketing locations after the posting of its website; in such embodiments, it can be the case that a link displayed at a given marketing location is removed from display because the registered user who selected the link changed its preferences. Likewise, the banner ads that are sequentially shown in the banner ad rotation region of a given website can change as new websites are created, old websites are deactivated or marketing location preferences change. System 100 charges the registered user's website a fee for participation in the linking and/or banner ad functions whenever links to the registered user's website are shown on other websites, or whenever the banner ad for the registered user's website is shown on other websites. For the registered user's website to participate in the linking and/or banner ad functions, the registered user must complete the website design process and save the selected locations for links and/or banner ads (as well as, in the case of participation in the banner ad functions, save the banner ad design for the registered user's website) at the server computer 140. In some embodiments, credit card (and payment) information must be provided by the registered user when the registered user is setting up the linking and/or banner ad rotation functions, i.e., after the registered user specifies the locations at which the registered user desires links and/or banner ads for its website to appear. The amount of payment can depend upon the number of links and/or banner ads to be displayed, i.e., the number of desired marketing locations.

Upon selection of the mail wiz option from the STAY STICKY™ menu 1210, a MAIL WIZ™ menu 1280 appears, which provides the registered user with a field 1285 for entering a desired quantity 1285 of e-mail messages to be sent out, and also provides an e-mail message field 1290 in which the registered user can input a desired e-mail message. Once the registered user completes the design of the website, and the website is posted/activated, the system 100 sends the specified e-mail message to other registered users (or their websites), whose e-mail addresses are located in third party user database 160. In certain embodiments, e-mail messages are only sent to selected locations that are specified by the registered user during development of the website, for example, the locations specified by the registered user in location selection menu 1260. In other embodiments, e-mail messages are also sent to the e-mail addresses of parties who are not registered users. In still further embodiments, the system 100 determines suggested e-mail addresses based upon the log in information provided by the registered user and the information in third party user database 160. In the preferred embodiment, the number of e-mail messages that are sent from the registered user's website to other e-mail addresses is recorded in a statistic log, and the number of e-mail messages that are received by the registered user's website is also recorded in the statistic log. Further in the preferred embodiment, the registered user provides payment to the system 100 for the quantity of e-mail messages to be sent as specified on MAIL WIZ™ menu 1280. System 100 continues to send e-mail messages on behalf of the registered user's website to other e-mail messages until the specified number of e-mail messages has been sent.

Figure 13:
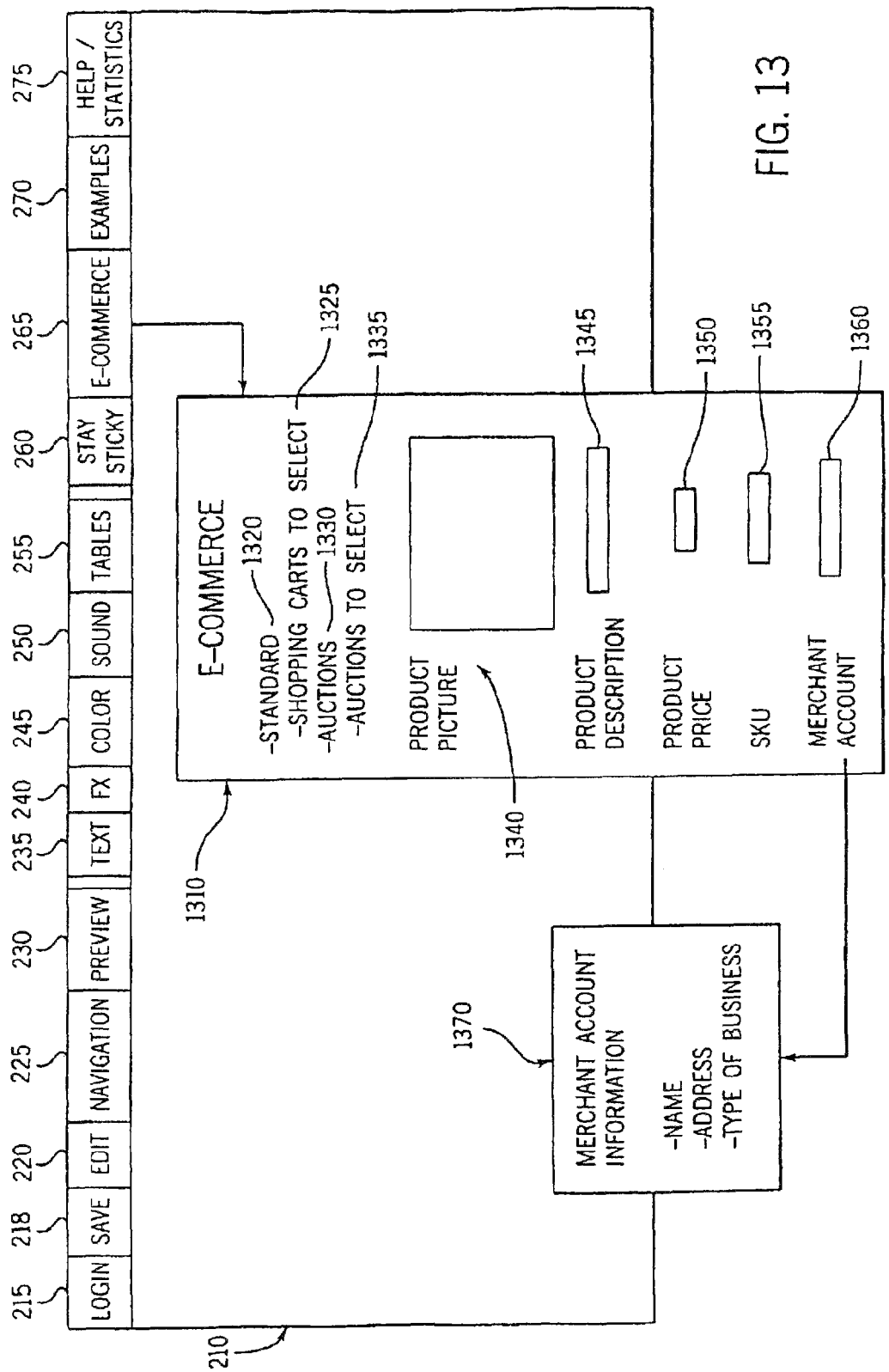
FIG. 13 illustrates the development of website e-commerce mechanisms, including shopping carts and auctions, as well as the setting-up of a merchant account, using the e-commerce feature of the website design plate.

Turning to FIG. 13, the registered user can select e-commerce button 265 to add to its website various features that allow for e-commerce (i.e., allow for the selling of goods and services over the internet). Upon the selecting of e-commerce button 265, an e-commerce menu 1310 appears. In the preferred embodiment, the registered user can select from two different types of e-commerce features, a standard e-commerce feature 1320 and an auction feature 1330. Upon selecting the standard e-commerce feature 1320, the registered user then can select one or more shopping carts from a shopping carts to select list 1325. Upon selecting the auction feature 1330, the registered user can select one or more types of auction features from an auction to select list 1335. After determining the type of e-commerce feature to be implemented on its website, the registered user then can upload (i.e., from a memory device at registered user computer 180) a picture of the product to be sold on the registered user's website, at product picture field 1340. Further, in a product description field 1345, a product price field 1350 and a SKU field 1355, a registered user can respectively input a description of the product to be sold at its website, the product's price and a SKU number correlating to the product. In the case where an auction feature has been selected, the product price entered in product price field 1350 is a reserve price. Also, in certain embodiments, the creation of an auction feature further requires the input of information, by the registered user, concerning starting and finishing times for the holding of auctions.

Finally, the registered user must input a merchant account identifier in a merchant account field 1360 indicating a merchant account that will apply to sales conducted using the shopping cart/auction of the registered user's website. If a merchant account relationship has not yet been established such that the registered user cannot enter a merchant account identifier, a merchant account information form 1370 appears, at which the registered user can enter necessary information for setting up a merchant account relationship. This information can include, for example, the name of the registered user's business, the address of the business, and the business type, among other types of information. In the preferred embodiments, the merchant account information form 1370 is a standard form that is provided by a credit card and/or merchant account provider. The credit card and/or merchant account provider providing the merchant account information form 1370 in certain embodiments pays a licensing or other fee to the system 100 in order to display its merchant account information form using the system. When the registered user has completed filling out the merchant account information form 1370, the filled out form is sent to the credit card and/or merchant account provider. The merchant account provider eventually responds back to the registered user with follow-up information concerning the setting up of the merchant account. The registered user cannot activate any of the e-commerce functions (i.e., functions employing a shopping cart or auction) without having completed the setting up of a merchant account with a merchant account provider. Once the merchant account is set up, however, the registered user enters the merchant account identification information into field 1360 and the e-commerce functionality can be activated.

Figure 14:
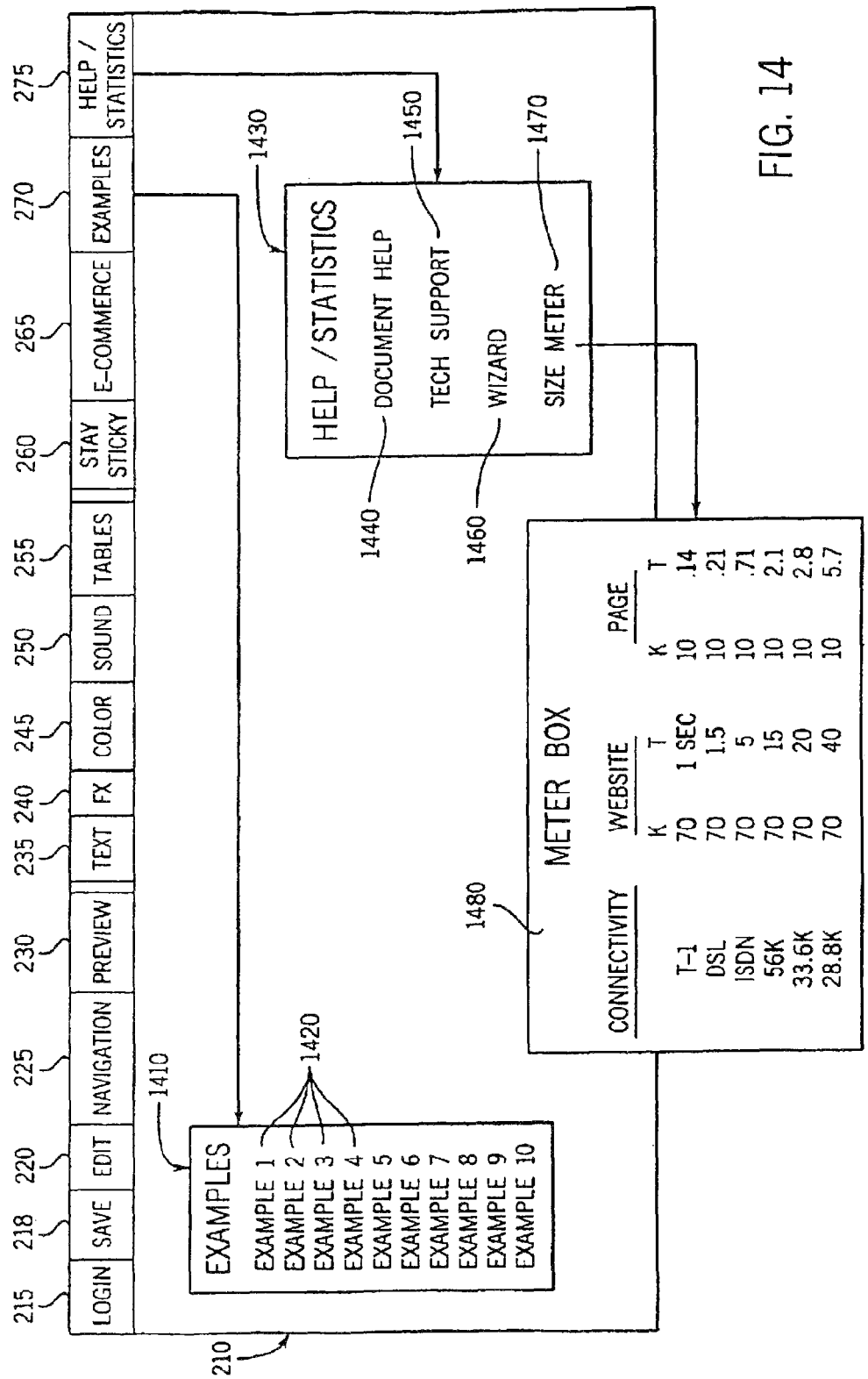
FIG. 14 illustrates the operation of examples and help/statistics features (including a size meter/meter box) of the website design plate.

Referring to FIG. 14, the system 100 is also capable of providing several types of assistance to the registered user during design of its website. The registered user can select the examples button 270 to bring up an examples menu 1410, which in the preferred embodiment lists ten examples 1420 that can be selected by the registered user. Each of the examples 1420, upon being selected by the registered user, shows how a web page, banner, logo, or other element can be designed using website design plate 210, STICKY PAD™ 310, and other features of the system 100. In the preferred embodiment, selection of an example 1420 produces a visual demonstration of an example website being taken apart and then put back together. While the example website is being put back together, a tutorial program runs that instructs the registered user on operating website design plate 210, STICKY PAD™ 310, and other features of system 100 to allow for the creation, saving, and posting/activation of a website using the system. In certain embodiments, the system 100 will conduct contests among registered users concerning the registered users' prowess in designing websites.

The registered user can also select the help/statistics button 275 to bring up a help/statistics menu 1430. Help/statistics menu 1430 lists four different options that are selectable by the registered user: a document help option 1440; a tech support option 1450, a wizard option 1460, and a size meter option 1470. Upon the selection of the document help option 1440, the GUI displays written instructions concerning various features of the system 100. For example, the GUI can display explanation messages concerning the purposes and operation of the various buttons 215-275 when the registered user selects any of those buttons (or, in certain embodiments, merely positions a cursor or other selection marker over one of those buttons). Also, for example, the GUI can display instructions as to how a web asset can be modified if that web asset is positioned within website design plate 210 or STICKY PAD™ 310.

With respect to tech support option 1450, the registered user can reach tech support for the system 100 by telephoning a particular telephone number (i.e., a 900 number), or by sending an e-mail to tech support. Then, by selecting tech support option 1450, tech support personnel for the system 100 can view the registered user's website online and provide the registered user with any needed website design information or other assistance either by way of telephone or e-mail while viewing the registered user's website online. Upon selection of the wizard option 1460, a wizard caricature appears that offers helpful hints and suggestions to the registered user during different steps in the website design process. The information provided by the wizard is similar to that provided in connection with document help option 1440, although the text shown is typically in a shortened form so that the text can be provided in a caption along side the wizard caricature. In alternate embodiments, the helpful hints and suggestions from the wizard caricature are verbalized using speech synthesis technology.

The registered user can further select size meter option 1470 to obtain information regarding how well the registered user's website, as currently designed, will perform upon posting. Upon the selection of the size meter option 1470, a meter box 1480 appears, in which a variety of information regarding the operability of the current website design is provided. In one embodiment, as shown in FIG. 14, the meter box 1480 includes information regarding each of the size of the entire web site currently being designed, the time required to download the entire website via the internet (to a computer accessing the website using a browser) the size of the current web page that is being displayed on website design plate 210, and the time for downloading that particular web page. Further in the preferred embodiment, each of these types of information is provided for the website when operating on different types of internet systems with different connectivities, such as internet systems using a T-1 communication link, a DSL or ISDN communication link, or modems having operation speeds of 56K, 33.6K or 28.8K. In certain embodiments, the registered user has an option to select the desired/expected connectivity of the website and to obtain information for that connectivity only.

In certain embodiments of the invention, meter box 1480 can contain less or more information concerning the expected operation of the website being designed. For example, in certain embodiments, the meter box 1480 only includes size information. In other embodiments, meter box 1480 includes not only size information regarding the entire website and individual web pages, but also provides a breakdown of the sizes of each web asset or other element on a given web page. In certain embodiments, running meter block 810 displayed in conjunction with STICKY PAD™ 310 contains the same information that is displayed in meter box 1480. Although in one embodiment, the meter box 1480 is only displayed when the size meter option 1470 is selected, in alternate embodiments, the meter box 1480 (or at least some of the information displayed in meter box 1480) is always displayed on website design plate 210. In such embodiments, the information being displayed that corresponds to the particular web page that is being edited varies as the registered user changes from editing one web page to editing a different web page using navigation button 225. The information can be shown on multiple lines or be provided in a single-line format to save display space. In the preferred embodiment, the information provided in meter box 1480 changes whenever a new web asset or other element is dropped into website design plate 210.

Further, in the preferred embodiment, the system 100 always monitors the current sizes of the website and web pages that are being designed, and provides a warning message whenever the website as a whole or individual web pages have exceeded maximum limits for size and download times (e.g., "Your site has exceeded download time parameters."). When the website being designed exceeds maximum size and/or download time parameters, the system 100 automatically displays relevant help message to provide the registered user with suggestions for reducing the size and/or download time of the website/web page. These warning and help messages can be provided by the wizard feature discussed above. If the registered user does not heed the warning concerning the size and/or download time of the website/web page, the system 100 automatically restricts the ability of the registered user to add additional web assets and other elements to the website/web page and thereby guarantees that the website, when completed, will be within acceptable size and download time guidelines.

At any time during the course of the design of a website using website design plate 210 (assuming the log in process has been completed, as discussed with reference to FIG. 11), the registered user can select preview button 230 to view the operation of the website in its current state of design. The registered user can view the operation of the website as it would appear using a variety of different internet browsers, e.g., the Netscape Navigator™ browser or the Microsoft Internet Explorer™ browser. Previewing the website does not save the website for activation, but rather gives the registered user a "snapshot" of the website in its current state, and allows the registered user to view the alignment, color schemes and other features of the website before the website is saved and activated. Further, at any time during the design of a website (assuming the log in process has been completed, as discussed with reference to FIG. 11), the registered user can select save button 218 to save the website in its present form at server computer 140 (specifically at third party user database 160). If the website design has been completed and the website is ready for submission and activation on the internet, the registered user can provide such an indication (in certain embodiments, an additional submit button is displayed on website design plate 210 to allow the registered user to immediately submit a completed website for activation on the internet).

If the registered user selects the save button 218 but has not yet provided payment information concerning the manner in which the registered user will be paying for its use of system 100, a payment box 1510 appears. Within payment box 1510, a message 1520 is provided to the registered user indicating that payment information is necessary (e.g., "Did you forget to pay?") and the registered user is provided with an option 1530 to pay by credit card. When the pay by credit card option 1530 is selected, a credit card information menu 1540 appears, in which the registered user can provided the necessary information for enabling credit card payment to the system 100 from the registered user's credit card. In one embodiment, the registered user must enter its name, credit card number, and expiration date in a name field 1550, a credit card number field 1560, and an expiration date field 1570, respectively. Once the credit card information is received at, and approved by, the system 100, the registered user can save its website design information. In the preferred embodiment, the registered user provides the same user identification and password information that were provided during the log in process at a user identification field 1580 and a password field 1590, respectively, for additional security. In addition to requiring credit card information for allowing the saving and submission of website design information by the registered user, the system 100 also requires credit card information to be provided before allowing the registered user to access certain other features. For example, tech support will only be provided when the registered user has provided credit card information or contacts tech support via the 900 number or e-mail. Also, the system 100 does not accept web addresses specified by the registered user for the purpose of creating links or participating in banner ad rotation unless the registered user has provided credit card information.

Figure 16A:
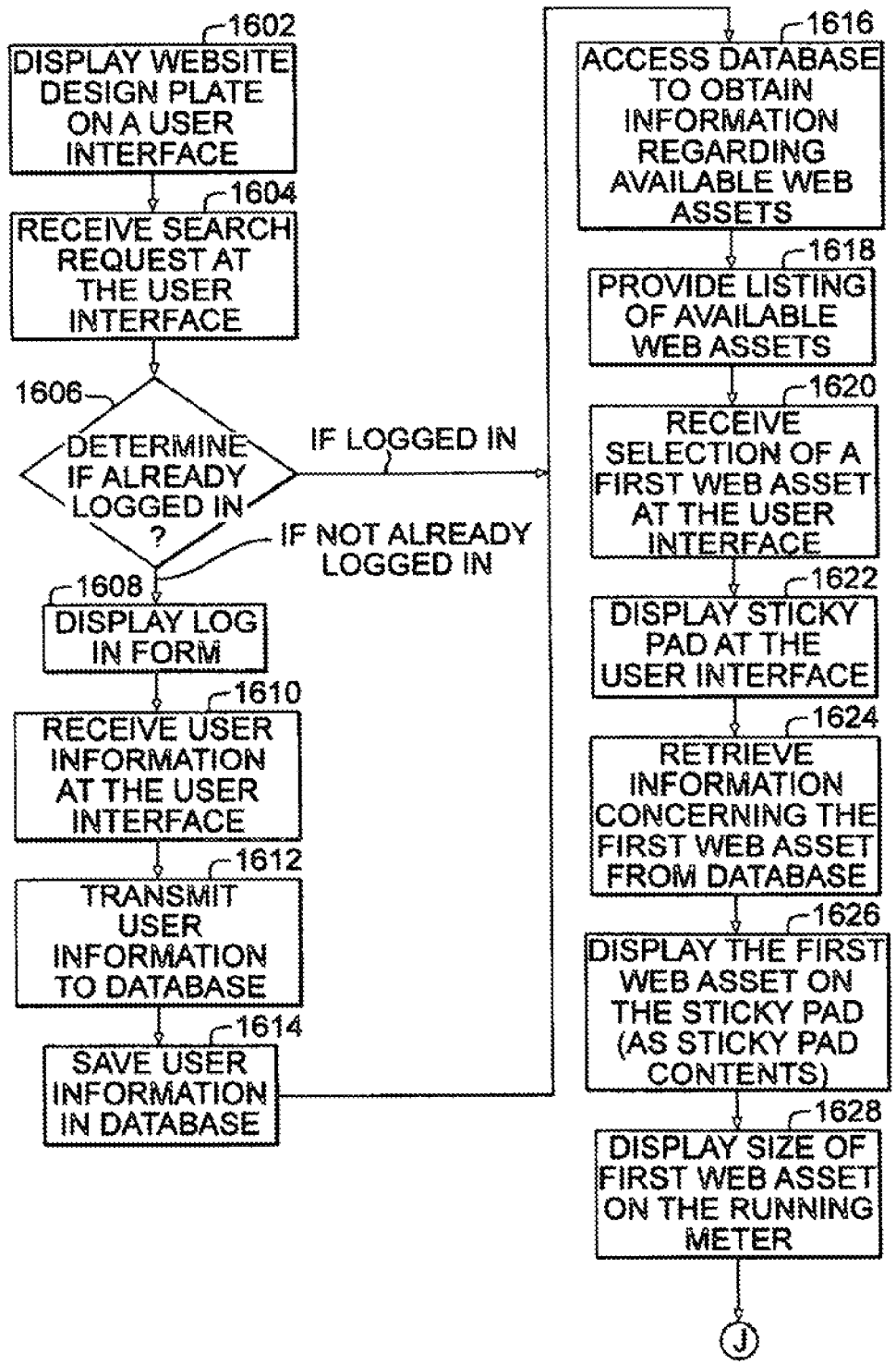
FIGS. 16A and 16B illustrate flowcharts with method steps for developing a web page of a website, in accordance with one embodiment of the present invention.
Figure 16B:
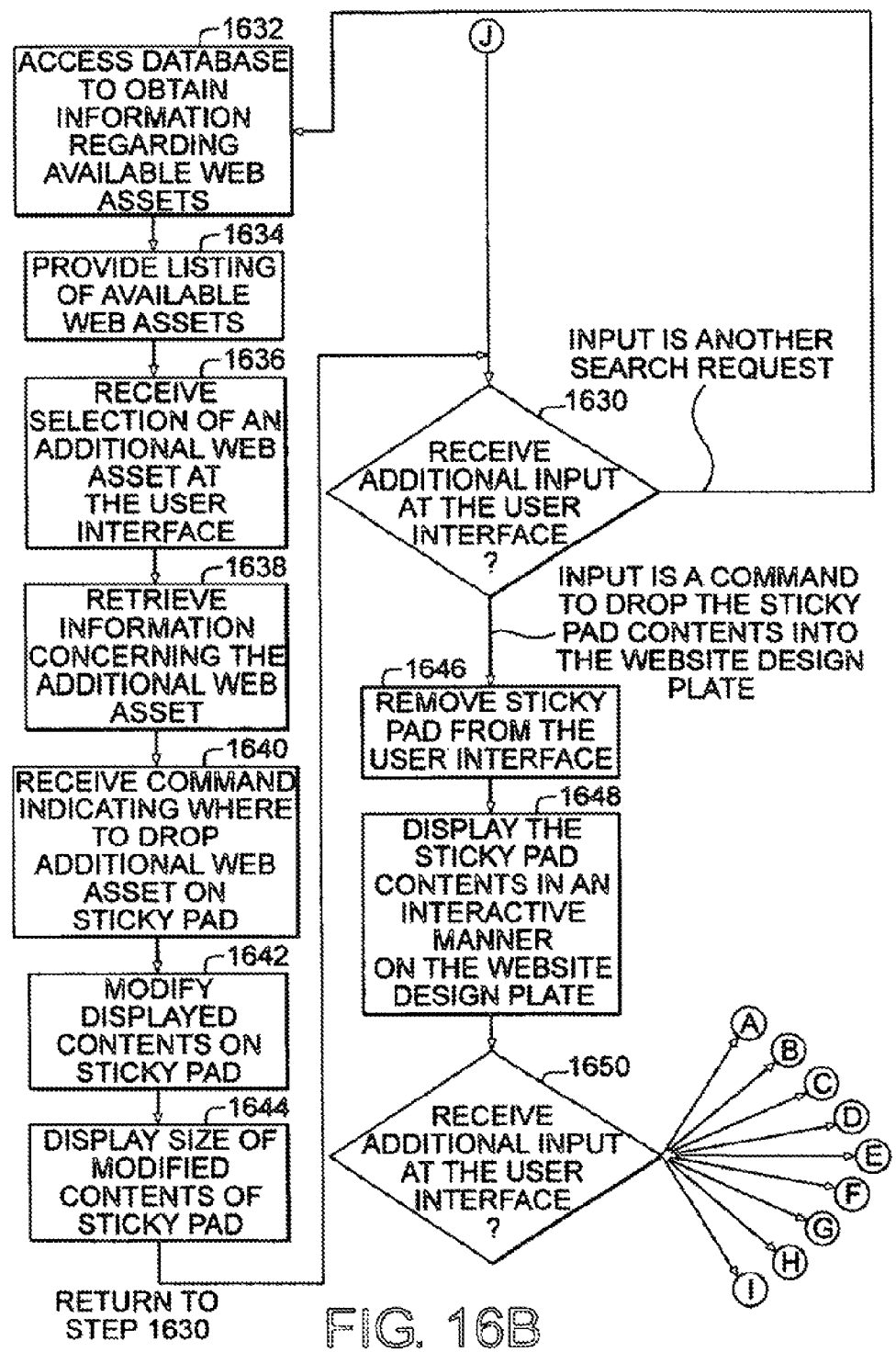

FIGS. 16A-23 provide flow charts showing exemplary steps of operation of the system 100 as it is used by the registered user to design a website. In particular, the flow charts concern the operation of the GUI, i.e., website design plate 210 and STICKY PAD™ 310. The flow charts of FIGS. 16A-22C can be combined together to form a larger collection of steps. Referring to FIGS. 16A and 16B, the operation of the GUI of the system 100 begins with the display of the website design plate 210 on a user interface at step 1602. The user interface can be a computer monitor, a television screen or any other input/output device that includes a display screen that is known in the art. Next, at step 1604, a search request is received at the user interface. At step 1606, the system 100 determines if the party accessing the system has already logged into the system. If the registered party has not already logged in (i.e., the party is a potential customer rather than a registered user), the system proceeds to step 1608, in which a login form such as that discussed with reference to FIG. 11 is displayed. At step 1610, the system 100 receives user information at the user interface (i.e., in the login form). At steps 1612 and 1614, respectively, the user information is transmitted to and saved at a database of the system, i.e., third party user database 160.

Upon completing the log in process (such that the potential customer is now a registered user), or if it was determined in step 1606 that the registered user was already logged in, the system proceeds to step 1616, at which the system accesses a database to obtain information regarding web assets or other elements. The information that is obtained is responsive to the search request entered at step 1604; that is, the information concerns web assets, if the search request was made via fx menu 430, concerns sound elements if the search request was made via sound menu 540 and concerns color elements if the search request was made via color pallet 640. The information concerning the web assets or other elements comes from web assets database 170. At step 1618, the GUI provides a listing of the available web assets or other elements, in fx menu 430, sound menu 540 or color pallet 640 depending upon the type of search request that was received at step 1604. At step 1620, the system 100 receives a selection indication from the registered user at the user interface that indicates a first web asset or other element that the registered user desires to implement in its website. Upon receiving this selection of a web asset or other element, the STICKY PAD™ 310 is displayed at the user interface. At step 1624, any further information that is necessary to display the selected web asset or other element is obtained from web assets database 170, and then, at step 1626, the selected web asset or other element is displayed on the STICKY PAD™ 310. In step 1628, the size of the selected web asset or other element is displayed on the STICKY PAD™ in the running meter block 810, which in alternate embodiments can also display the download time or other information regarding the selected web asset or other element.

At step 1630, the system 100 receives an additional input at the user interface from the registered user. If the additional input is another search request (as in step 1604), the system 100 again accesses web assets database 170 to obtain information regarding available web assets or other elements, at step 1632. At step 1634, the system 100 again provides a listing of available web assets or other elements that is responsive to the search request. At step 1636, the system 100 receives an input from the registered user indicating which of the listed web assets or other elements is desired for implementation in the registered user's website. Then, in step 1638, the system 100 retrieves information concerning the selected web asset or other element. Further, at step 1640, the system 100 receives an additional input from the registered user that is a command indicating where to position the newly selected web asset or other element on the STICKY PAD™ 310. The input can be a command to drag and drop the selected web asset or other element onto the first web asset or other element that is already positioned within the STICKY PAD™ 310, or can be merely a command to display the selected web asset or other element at some location within design space 280 of STICKY PAD™ 310. In response to this input command, the displayed contents of the STICKY PAD™ 310 are modified to include the newly selected web asset or other element at step 1642. Upon modifying the displayed contents of the STICKY PAD™ 310, the size of the modified contents of the STICKY PAD™ is displayed (i.e., updated) at the running meter block 810 of the STICKY PAD™, at step 1644. The program then returns to step 1630.

The additional input received at the user interface at step 1630 can also be a command to drop the STICKY PAD™ contents into the website design plate 210. If this occurs, the STICKY PAD™ 310 is removed from the user interface, i.e., is no longer displayed, at step 1646. Then, at step 1648, the STICKY PAD™ contents are displayed in an interactive manner on the website design plate 210. The system 100 then is ready to receive an additional input at the user interface, at step 1650. In certain embodiments in which the GUI can display both website design plate 210 and STICKY PAD™ 310 simultaneously (e.g., on different parts of the display screen of the user interface), the STICKY PAD™ 310 need not be removed from display. Rather, the contents of the STICKY PAD™ 310 need only be moved or copied to the website design plate 210.

Figure 17A:
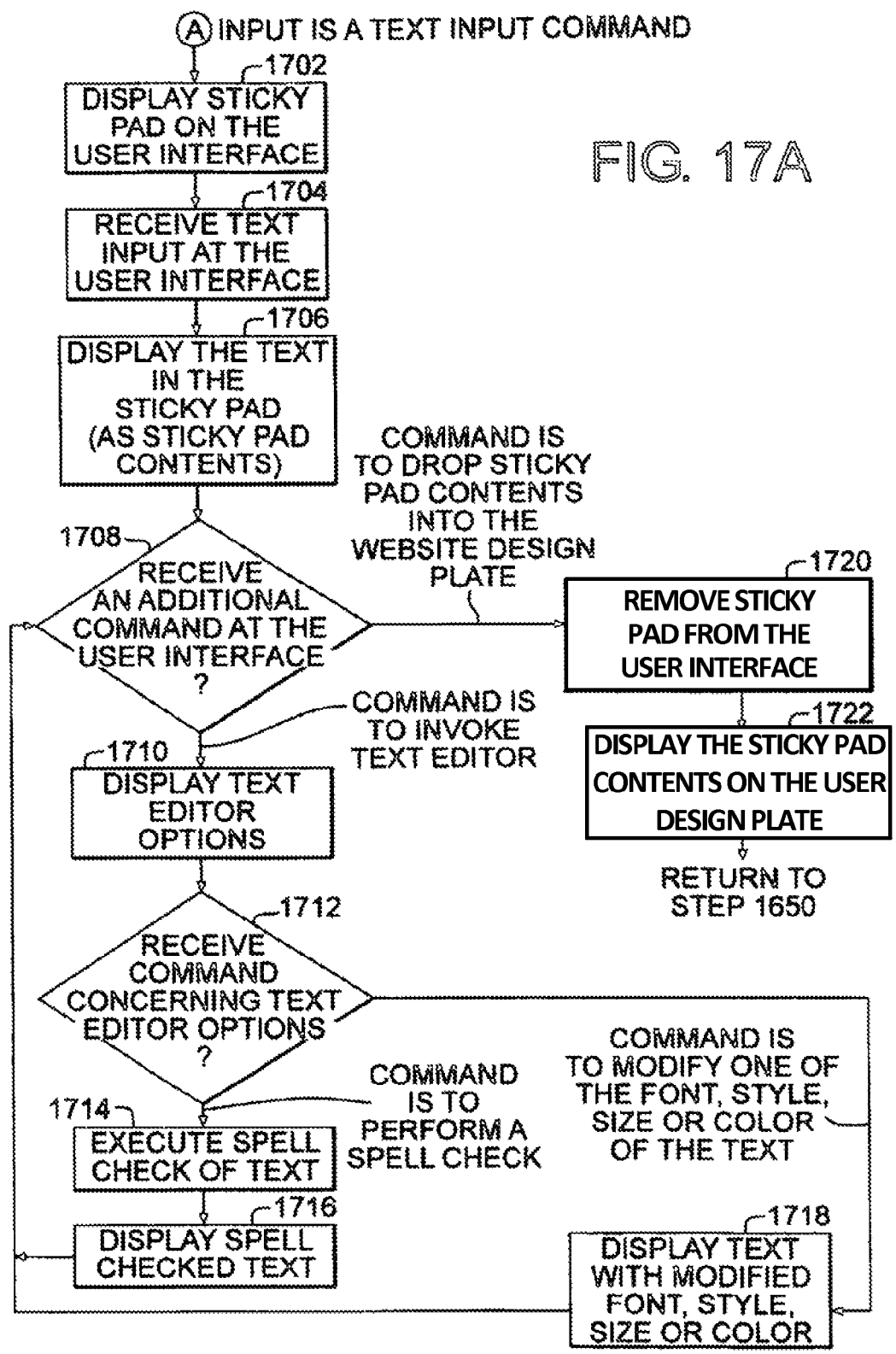

Referring to FIG. 17A, if the input received at the user interface at step 1650 is a text input command, the system 100 immediately displays STICKY PAD™ 310 again on the user interface at step 1702. The text input command is a selection of text button 235. Once STICKY PAD™ 310 is displayed, the registered user can input text by typing text at the user interface, which is received by the system 100 at step 1704. The text that is input at the user interface by the registered user is displayed in the STICKY PAD™ 310, at step 1706. Then, at step 1708, the system 100 receives an additional command at the user interface. If the command is to invoke the text editor, i.e., the registered user selects text editor button 345 of STICKY PAD™ 310, the system 100 proceeds to step 1710, and displays text editor options.

At step 1712, the system 100 receives a command concerning the text editor options. If the registered user provides a command to perform a spell check, the system 100 then executes a spell check of the text at step 1714 and displays the spell checked text at step 1716, before returning to step 1708 to receive an additional command. If the received command at step 1712 is to modify one of the font, style, size or color of the text, the system 100 performs the requested modification and then displays the modified text at step 1718 before returning to step 1708 to receive an additional command. The command to modify the font, style, size or color of the text can include a selection of a change font, change style, change size or change color button, followed by a selection of a desired font, style, size or color to be applied to the text being edited. At step 1708, it is also possible to receive a command to drop the STICKY PAD™ contents back into the website design plate 210. If such a command is received, the STICKY PAD™ 310 is removed from the user interface (i.e., is no longer displayed) at step 1720, and then the STICKY PAD™ contents are displayed on the website design plate 210, at step 1722. The program then returns to step 1650 for receipt of an additional input at the user interface.

Referring to FIG. 17B, the additional input received at step 1650 can also be the selection of tables button 255 of the website design plate 210 by the registered user, indicating that the registered user wishes to generate a table or cell. Upon selection of the tables button 255, the system 100 displays the options concerning the creation of tables and cells, including their location within a website (i.e., by displaying tables menu 1110), at step 1750. At step 1752, the system 100 receives a selection concerning the tables and cells from the registered user at the user interface. At step 1754, the selected table or cell is displayed on the website design plate 210. Next, at step 1756, a command can be received to modify the position or size of the table or cell. Upon receiving such a command, the table or cell is appropriately adjusted in position and/or size at step 1758. The command to modify the position or size of the table or cell at step 1756 can include a command or selection input concerning the location of the table or cell within the website or on a web page (i.e., by way of locations button 1140). Upon completion of the table or cell, the system 100 returns to step 1650.

Turning to FIGS. 18A and 18B, the additional input received at the user interface at step 1650 can be a save input or a preview input, which the registered user can provide by selecting save button 218 or preview button 230 of the website design plate 210, respectively. Upon receiving the save input, the system 100 determines in step 1802 whether payment has been received from the registered user. If payment has not yet been received from the registered user, the system 100 displays at the user interface an inquiry as to whether payment has been forgotten at step 1804. Upon receiving a pay by credit card input at the user interface, at step 1806, the system displays a credit card information form at step 1808 (i.e., credit card information menu 1540). In step 1810, credit card information is received from the registered user at the user interface and, at step 1812, the system 100 determines whether the information provided is adequate. If the credit card information is inadequate, the system 100 returns to step 1808 and the credit card information form is again displayed. If the credit card information is adequate, the system 100 proceeds to step 1814, in which payment is received from the registered user's credit card by way of a standard e-commerce credit card transaction. Upon receiving payment at step 1814, or having determined that payment was already received at step 1802, the system 100 saves all of the website design information that is currently existing in website design plate 210 at the server computer 140, at step 1816. The saved website design information can then be used to post/activate an operational website on the internet. Upon saving the information, the system 100 returns to step 1650. With respect to FIG. 18B, if the input at step 1650 is a preview input, the system 100 proceeds to step 1818, at which a preview of the website's operation given its current state of development is provided. This allows for the registered user to view a simulation of the operation of its website, before the website is saved or activated on the internet. After providing this preview or simulation, the system 100 returns to step 1650.

Figure 19A:
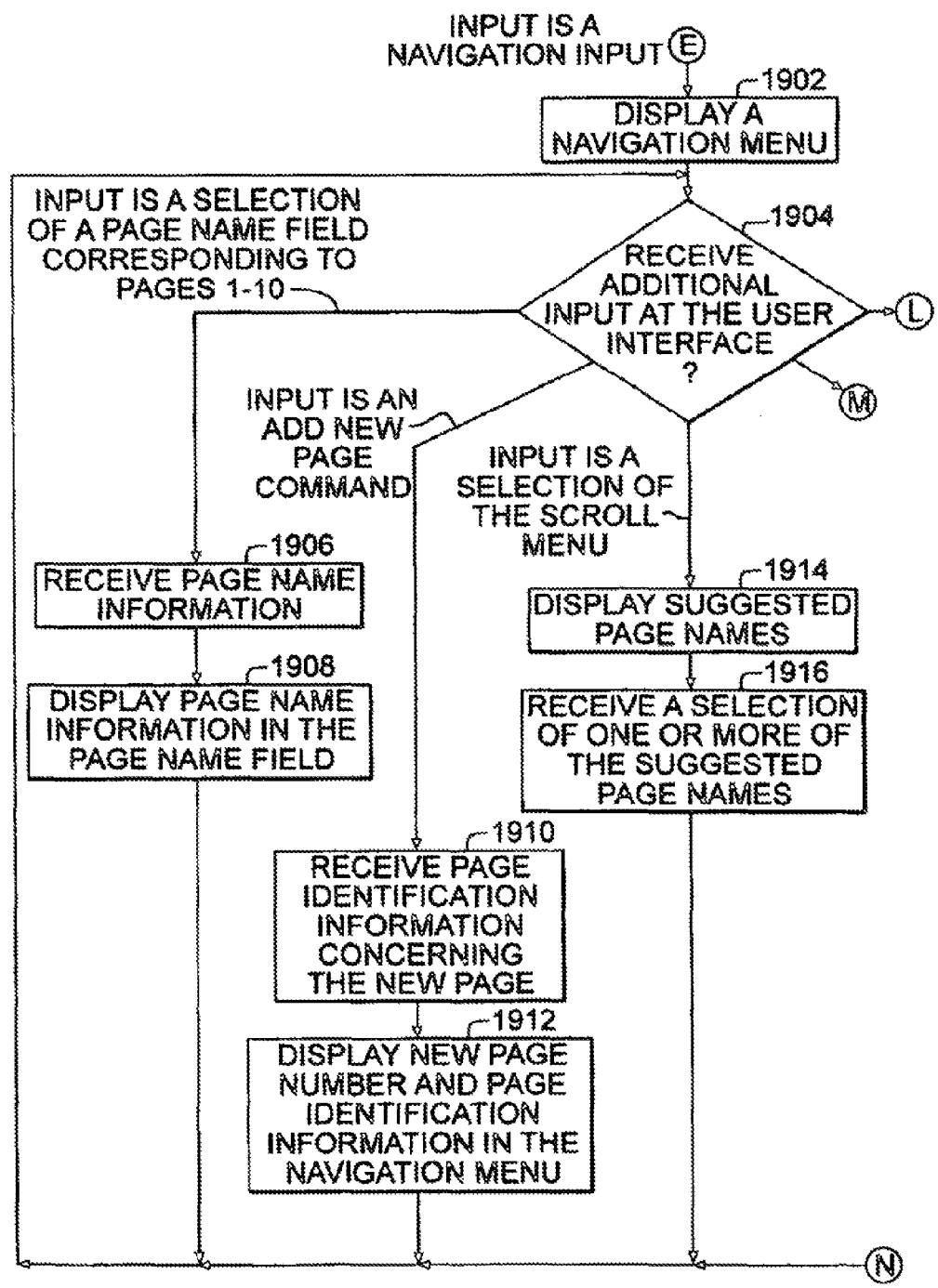

Referring to FIGS. 19A and 19B, the additional input received at step 1650 can also be a navigation input, which the registered user provides by selecting navigation button 225 of website design plate 210. Upon receiving the navigation input, the system 100 displays a navigation menu (i.e., navigation menu 1010), and then receives an additional input at the user interface, at steps 1902 and 1904, respectively. If the additional input received at the user interface at step 1904 is a selection of a page name field corresponding to pages 1-10 (i.e., fields 1015), the system 100 receives page name information from the registered user at step 1906 and then displays the page name information in the page name field at step 1908, before returning to step 1904 to receive an additional input at the user interface. If the input received at step 1904 is an add new page command (i.e., provided by selecting add new page button 1020), the system 100 receives page identification information concerning the newly added page at step 1910 and displays the new page number and page identification information on the navigation menu at step 1912 before returning to step 1904.

If the input at step 1904 is a selection of the scroll menu (i.e., provided by selecting scroll menu button 1030), the system 100 displays suggested page names at step 1914, and then receives a selection of one or more of the suggested page names from the registered user at step 1916 before returning to step 1904. If the input received at step 1904 is a selection of the navigation locations menu (i.e. selection of navigation locations button 1050), the system 100 displays a list of locations within a web page at which navigation information can be displayed, at step 1918. Upon receiving a selected location for the navigation information from the registered user at step 1920, the system returns to step 1904. Further, if the input received at step 1904 is a selection of one of the displayed page numbers on the navigation menu 1010, the display of the navigation menu is ended at step 1922, and the selected web page is displayed on the website design plate 210 at step 1924. The system 100 then returns to step 1650.

Referring to FIGS. 20A and 20B, the registered user can provide a STAY STICKY™ input at step 1650 by selecting STAY STICKY™ button 260. Upon receiving such an input, the system 100 displays STAY STICKY™ menu 1210 at step 2002 and then receives a STAY STICKY™ selection at step 2004. If the received selection is for the smart agent feature, the system 100 then receives an input concerning the smart agent feature at smart agent menu 1220, at step 2006. If the received input is a request for suggested marketing locations, the system 100 checks third party user database 160 to determine whether suggested marketing locations had previously been determined, at step 2008. If suggested marketing locations had been previously determined, these suggested marketing locations are then displayed at the user interface, at step 2014. If suggested marketing locations had not been previously determined, the system 100 accesses third party user database 160 to obtain the registered user's log in information, and then determines suggested marketing locations based upon this log in information, at steps 2010 and 2012, respectively. Once the suggested marketing locations are determined, these suggested marketing locations are then displayed at step 2014. Following display of the suggested marketing locations at step 2014, the system 100 returns to step 2004.

If the STAY STICKY™ selection received at step 2004 is to create links, the system 100 then receives marketing location selections at the user interface at step 2018. The marketing location selection information can be provided by the registered user at location selection menu 1260. Upon receiving the marketing location selection information, the marketing location selection information is stored at third party user database 160 at step 2020. This stored information is later used to generate links at the selected marketing locations (i.e., websites) when the registered user's website is activated. The system 100 then proceeds to step 2022, at which the system determines whether a reciprocal link site has already been created in the registered user's website, for displaying links to other websites. If a link site has not yet been created, the system creates a link site on the registered user's website, at step 2024 before returning to step 1650. Otherwise, the system 100 immediately returns to step 1650.

If the STAY STICKY™ selection received at step 2004 is for banner ad rotation, the system 100 proceeds to step 2026, at which the system determines whether a banner ad has already been created by the registered user. If a banner ad has not yet been created, the system 100 proceeds to step 2028, in which the system displays at the user interface a message indicating that a banner ad needs to be created by the registered user in order to participate in banner ad rotation, before returning to step 1650. A banner ad can then be created by the registered user using the capabilities of the website design plate 210 and the STICKY PAD™ 310, including the search capabilities. If it is determined at step 2026 that a banner ad has already been created by the registered user, the system 100 proceeds to step 2030, at which it receives marketing location selection information at the user interface. The marketing location selection information can be provided at location selection menu 1260 or a similar menu, and can include marketing location selections that were determined by the system at step 2012.

At step 2032, the marketing location selection information provided from the registered user is stored in third party user database 160, where it can be later accessed upon activation of the registered user's website. The system 100 then proceeds to step 2034, at which it determines whether a reciprocal banner ad site has already been created on the registered user's website, so that banner ads from other websites can be displayed on the registered user's website once it is activated. If a banner ad site has not yet been created, the system 100 creates a banner ad site at step 2036 before returning to step 1650. Otherwise, if a banner ad site has already been created, the system 100 immediately returns to step 1650. Upon activation of the registered user's website, the registered user's website can display an unlimited number of banner ads from other websites on its reciprocal banner ad site, and the system 100 also displays the registered user's banner ad at the marketing locations (websites) that the registered user specified at step 2030.

If, at step 2004, the STAY STICKY™ selection is for the MAIL WIZ™ feature, the system 100 proceeds to step 2038 and displays MAIL WIZ™ menu 1280. The system 100 then receives an input from the registered user concerning the number of parties that the registered user desires to be included on the registered user's e-mail list, at step 2040. Further, at step 2042, the system 100 receives an input at the user interface concerning the registered user's desired e-mail message. All of the received information is then saved in third party user database 160, before the system 100 returns to step 1650. Upon activation of the registered user's website, e-mail messages are sent to other registered user's websites, and the number of e-mail messages sent is monitored by the system 100. Although not shown in FIGS. 20A and 20B, in some embodiments credit card information (and payment) must be received by the system 100 in order to set up and activate the STAY STICKY™ features, i.e., banner ad rotation, links creation, and MAIL WIZ™ In such embodiments, the system 100 performs steps 1808-1814 (shown with respect to FIG. 18A) during or immediately following its performance of steps 2018-2024, 2026-2036 and 2038-2044 concerning links creation, banner ad rotation and MAIL WIZ™, respectively.

Figure 21A:
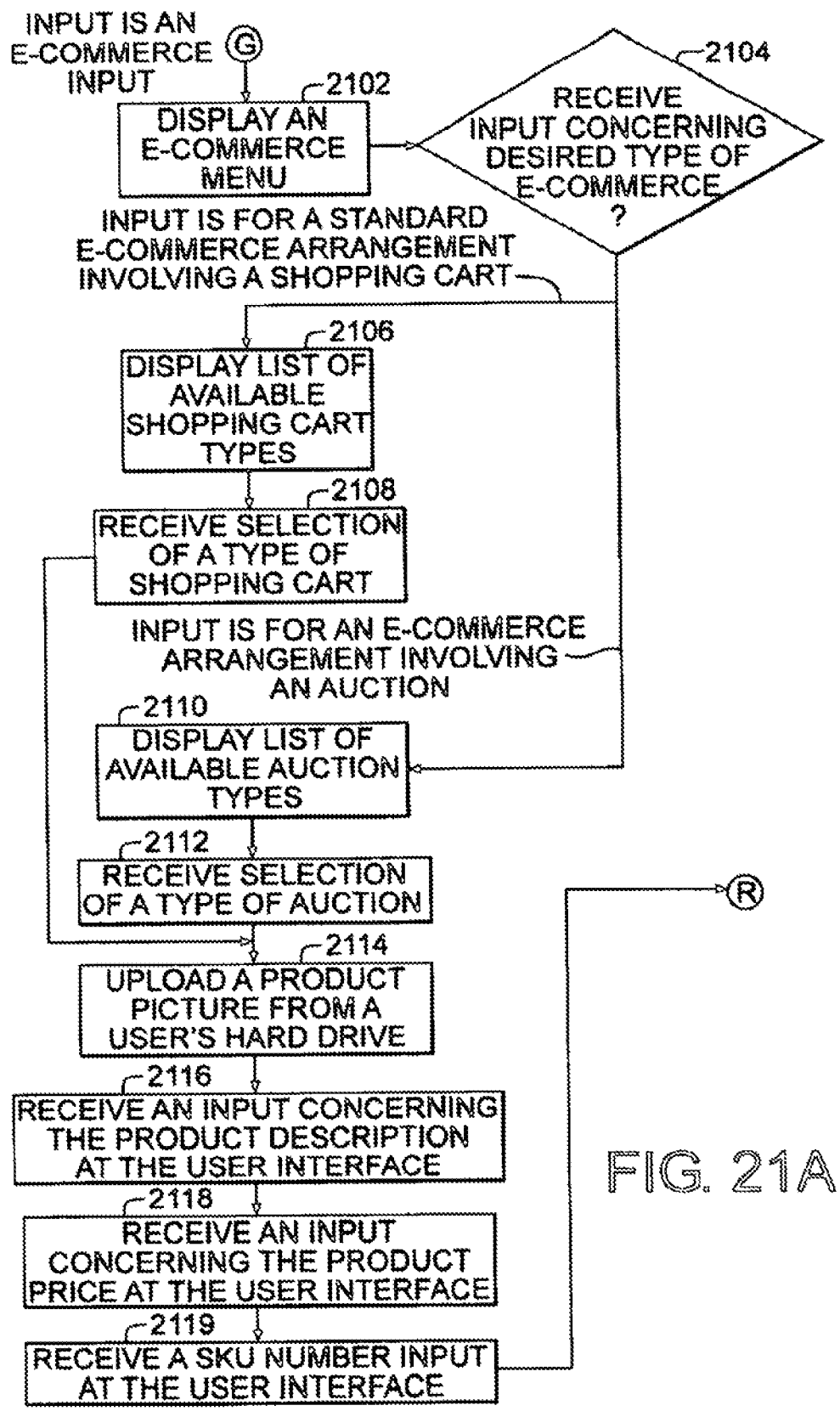

Referring to FIGS. 21A, 21B and 22C, the registered user can provide an e-commerce input at step 1650 by selecting e-commerce button 265 from website design plate 210. Upon receiving the e-commerce input, the system 100 displays e-commerce menu 1310, at step 2102. The system 100 then receives at step 2104 an input from the registered user concerning the desired type of e-commerce. If the received input indicates that the registered user desires to employ a standard e-commerce arrangement involving a shopping cart, the system 100 displays a list of available shopping cart types at step 2106. The system then receives a selection of a type of shopping cart from the registered user at step 2108, before proceeding to step 2114. If the received input at step 2104 is for an e-commerce arrangement involving an auction, the system 100 displays a list of available auction types at step 2110, and then receives a selection of a type of auction from the registered user at step 2112 before proceeding to step 2114. At step 2114, the system 100 uploads a product picture provided from the registered user, i.e., from the hard drive of the registered user computer 180. Then, the system 100 further receives inputs concerning the product description, the product price and the product SKU number at the user interface, at steps 2116, 2118, and 2119, respectively. If the e-commerce arrangement selected by the registered user involves an auction, the product price information received from the registered user at step 2118 concerns a reserved price.

Next, at step 2120, the system 100 determines whether merchant account information has already been provided from the registered user. If merchant account information has not yet been provided, the system 100 displays merchant account information form 1370, at step 2122. Upon receiving merchant account information at the user interface from the registered user at step 2124, the system 100 then sends the merchant account information to the merchant account vendor for processing at step 2126, before returning to step 1650. Although, because the registered user has not yet concluded its merchant account arrangement, the system 100 cannot finalize the registered user's e-commerce arrangement, the information provided by the registered user in steps 2104 to 2119 can be saved and utilized again once the registered user's merchant account arrangement has been finalized. If, at step 2120, it is determined that the merchant account information has already been provided by the registered user, the system 100 receives a merchant account identification number or other identifier at the user interface, at step 2128, and then proceeds to display the finalized shopping cart or auction feature at website design plate 210. The system 100 then returns to step 1650.

Turning to FIG. 22A, the registered user can provide an examples input by selecting examples button 270 from website design plate 210. Upon such a selection, the system 100 displays an examples menu at the user's interface, at step 2124. The system 100 then receives an example selection by the registered user at the user interface, at step 2226, and then displays the selected example, at step 2228, before returning to step 1650. With respect to FIG. 22B, if the registered user provides a help/statistics input by selecting help/statistics button 275 of the web design plate 210 at step 1650, the system 100 proceeds to display help/statistics menu 1430, at step 2202. The system 100 then receives a help/statistics selection at step 2204. If the help/statistics selection is a document help input, the system 100 accesses programming database 190 to obtain relevant written help instructions, at step 2206, and then displays the written help instructions at the user interface, at step 2208, before returning to step 1650. If the received help/statistics selection concerns tech support, the system 100 displays a message indicating that tech support can be obtained either by sending an e-mail message or by telephone, at step 2210. The system 100 then provides the registered user with an option to proceed with tech support, which option must be selected by the registered user in order for a tech support specialist to view the current status of the registered user's GUI and provide assistance, at step 2211. Once assistance has been provided, the system 100 returns to step 1650.

If the received help/statistics selection concerns a wizard input, as shown in FIG. 22C, the system 100 displays the wizard caricature at the user interface, at step 2212. The system 100 then accesses programming database 190 to obtain any relevant wizard suggestions, at step 2214, and then displays the relevant wizard suggestions, at step 2216, before returning to step 1650. If the help/statistics selection received at step 2204 is a size meter input, then the system calculates size and download time parameters for the registered user's website, as well as for the current web page being displayed by website design plate 210, at step 2218. Then, at step 2220, the system 100 displays at the user interface meter box 1480, which shows the size and download time parameters for the registered user's website and the currently displayed web page, before returning to step 1650.

Figure 23:
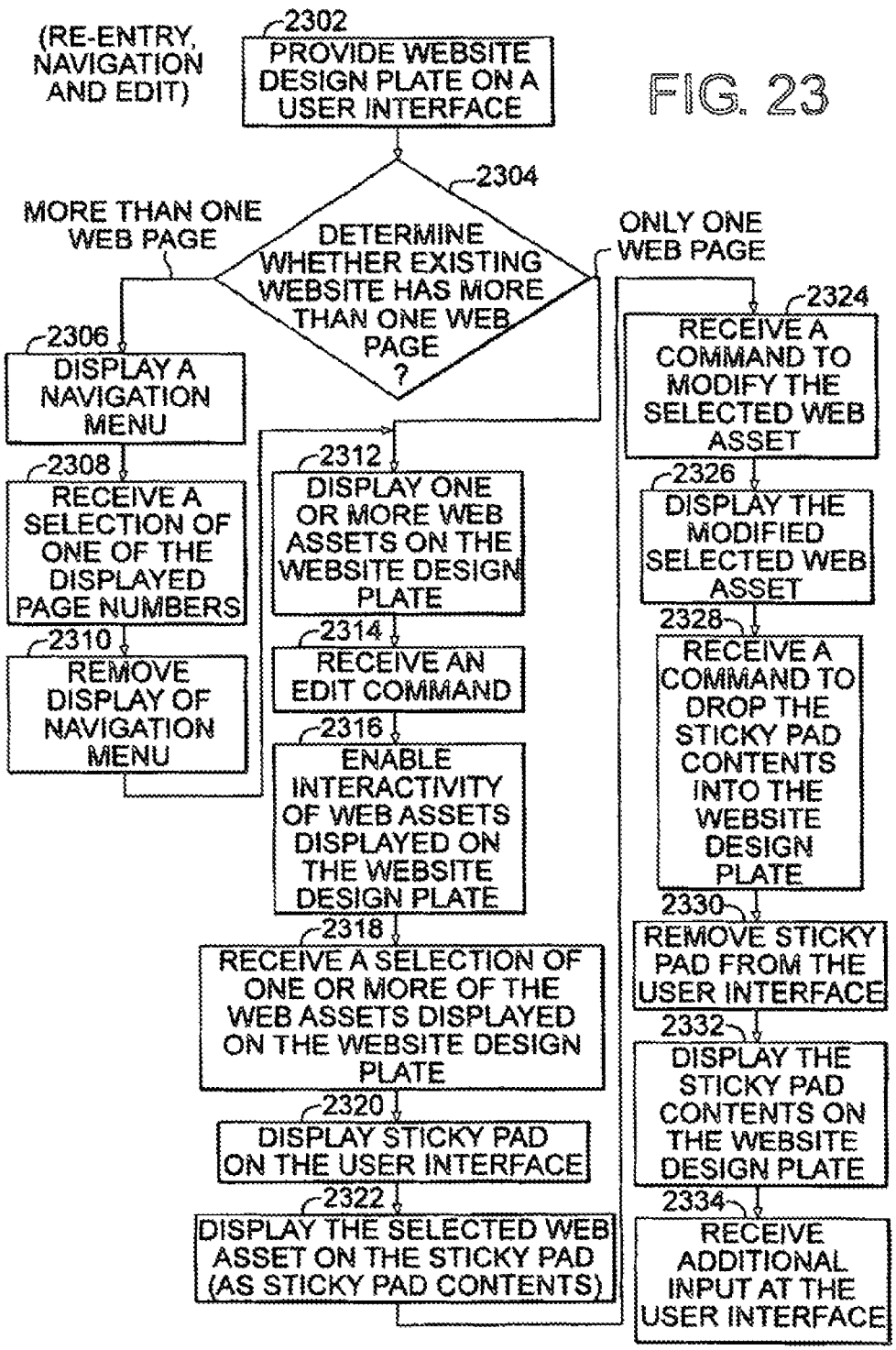
FIG. 23 illustrates a flowchart with method steps for recommencing development of, and editing, a website that has already been partially developed using the GUI of FIG. 2.

Turning to FIG. 23, an additional flow chart is provided showing operation of the system 100 when the registered user is returning to the system to complete a website design that was previously begun. At step 2302, website design plate 210 is provided at the user interface. If the system 100 determines that the registered user's website in its current state of development has more than one web page, at step 2304, the system 100 displays navigation menu 1010 at step 2306. The system 100 then receives a selection of one of the web page numbers displayed on navigation menu 1010, at step 2308. Upon receiving a selected web page number, the system 100 removes navigation menu 1010 from the user interface, at step 2310, and displays the one or more web assets and other elements of the selected web page on the website design plate 210, at step 2312. Further, if the system 100 determines, at step 2304, that the registered user's website in its current state of development has only web page, the system displays the one or more web assets or other elements of that web page on the website design plate 210, at step 2312.

Next, at step 2314, the system 100 receives an edit command provided by the registered user by selecting edit button 220. Upon receiving the edit command, the system 100 causes each of the web assets and other elements that are displayed on the website design plate 210 to become interactive, at step 2316. The system 100 then receives a selection of one or more of the web assets or other elements displayed on the website design plate, at step 2318. In response to this selection, the system 100 displays STICKY PAD™ 310 on the user interface, at step 2320, and further displays the selected web asset or other element on the STICKY PAD™ as the STICKY PAD™ contents, at step 2322. At step 2324, the system 100 receives a command to modify the selected web asset or other element displayed within STICKY PAD™ 310. This command can involve adding additional web assets, sounds or colors to the selected web asset or to the design space 280 surrounding the selected web asset, as well as involve moving the selected web asset within design space 280 or resizing the selected web asset, among other modifications.

At step 2326, the modified web asset or other element, or modified contents of the STICKY PAD™ 310, are displayed within the STICKY PAD™ At step 2328, the system 100 receives a command to drop the contents of the STICKY PAD™ 310 into the website design plate 210. Next, at step 2330, the STICKY PAD™ 310 is removed from the user interface (i.e., is no longer displayed) and the contents of the STICKY PAD™ 310 are moved onto the website design plate 210, at step 2332. The design of the registered user's website can continue with the receiving of additional inputs from the registered user at the user interface, at step 2334.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method, within a computer hardware system, comprising:
    associating, with a first entity, limited access rights to the computer hardware system;
    removing, in response to the first entity submitting a registration for a first web page, the limited access rights previously associated with the first entity;
    inserting, within the first web page, a first functional identification element associated with a second entity; and
    reciprocally inserting, within a second web page associated with the second entity, a second functional identification element associated with the first entity based upon the first functional identification element being inserted within the first web page, wherein
    the second functional identification element, within the second web page, includes a link to the first web page, and
    the first functional identification element, within the first web page, includes a link to the second web page.

2. The method of claim 1, wherein
the second functional identification element includes an image.

3. The method of claim 2, further comprising
receiving, from the first entity, the image.

4. The method of claim 1, wherein
the computer hardware system is a server system.

5. The method of claim 4, wherein
the server system is a webpage implementation server system.

6. The method of claim 1, wherein
the first web page includes one or more web pages.

7. A webpage implementation server system, comprising:
a computer hardware system configured to perform:
    associating, with a first entity, limited access rights to the computer hardware system;
    removing, in response to the first entity submitting a registration for a first web page, the limited access rights previously associated with the first entity;
    inserting, within the first web page, a first functional identification marketing element associated with a second entity; and
    reciprocally inserting, within a second web page associated with the second entity, a second functional identification element associated with the first entity based upon the first functional identification element being inserted within the first web page, wherein
    the second functional identification element, within the second web page, includes a link to the first web page, and
    the first functional identification element, within the first web page, includes a link to the second web page.

8. The server system of claim 7, wherein
the second functional identification element includes an image.

9. The server system of claim 8, wherein the computer hardware system is further configured to perform
receiving, from the first entity, the image.

10. The server system of claim 7, wherein
the first web page includes one or more web pages.

11. The server system of claim 7, wherein the computer hardware system is further configured to perform
inserting, into the first web page, a web asset authored by a third party separate from the computer hardware system.

12. The server system of claim 11, wherein
the web asset is a functional application.

13. A webpage implementation system, comprising:
a client computer associated with a first entity; and
a server system configured to perform:
- associating, with a first entity, limited access rights to the computer hardware system;
- removing, in response to the first entity submitting a registration for a first web page, the limited access rights previously associated with the first entity;
- inserting, within the first web page, a first functional identification marketing element associated with a second entity; and
- reciprocally inserting, within a second web page associated with the second entity, a second functional identification element associated with the first entity based upon the first functional identification element being inserted within the first web page, wherein the second functional identification element, within the second web page, includes a link to the first web page, and the first functional identification element, within the first web page, includes a link to the second web page.

14. The webpage implementation system of claim 13, wherein
the second functional identification element includes an image.

15. The webpage implementation system of claim 14, wherein the server system is further configured to perform
receiving, from the first entity via the client computer, the image.

16. The webpage implementation system of claim 13, wherein
the first web page includes one or more web pages.

17. The webpage implementation system of claim 13, wherein the server system is further configured to perform
generating, based upon input provided by the first entity, the first web page; and
generating, based upon input provided by the second entity, the second web page.

* * * * *